(12) United States Patent
Berggren et al.

(10) Patent No.: US 8,945,795 B2
(45) Date of Patent: Feb. 3, 2015

(54) METHODS AND APPARATUSES FOR CONTINUOUS MANUFACTURING OF FUEL CELLS

(75) Inventors: Martin Berggren, Mölnlycke (SE); Lars Johansen, Dröbak (NO); Börge Rygh Sivertsen, Oslo (NO)

(73) Assignee: Powercell Sweden AB, Göteborg (SE)

( * ) Notice: Subject to any disclaimer, the term of this patent is extended or adjusted under 35 U.S.C. 154(b) by 1072 days.

(21) Appl. No.: 12/447,913

(22) PCT Filed: Oct. 29, 2007

(86) PCT No.: PCT/SE2007/000957
§ 371 (c)(1), (2), (4) Date: Dec. 8, 2009

(87) PCT Pub. No.: WO2008/054287
PCT Pub. Date: May 8, 2008

(65) Prior Publication Data
US 2010/0112403 A1 May 6, 2010

(30) Foreign Application Priority Data
Oct. 31, 2006 (WO) .................. PCT/SE2006/001236

(51) Int. Cl.
*H01M 8/00* (2006.01)
*H01M 8/02* (2006.01)
*H01M 8/10* (2006.01)
*H01M 8/24* (2006.01)

(52) U.S. Cl.
CPC .............. *H01M 8/00* (2013.01); *H01M 8/0297* (2013.01); *H01M 8/1016* (2013.01); *H01M 8/24* (2013.01); *Y02E 60/521* (2013.01)
USPC ........... 429/535; 429/434; 429/452; 429/468; 429/469

(58) Field of Classification Search
USPC ............ 429/452, 535, 434, 468, 469; 156/60, 156/64, 538
See application file for complete search history.

(56) References Cited

U.S. PATENT DOCUMENTS
3,480,495 A * 11/1969 Sohn et al. ...................... 156/94
2003/0215693 A1 11/2003 Asai et al.
(Continued)

FOREIGN PATENT DOCUMENTS
DE  10322537 A1  1/2004
DE  10259975 B3  6/2004
(Continued)

OTHER PUBLICATIONS
First Office Action for corresponding Chinese Application 200780040581.X.
(Continued)

*Primary Examiner* — Sean P Cullen
(74) *Attorney, Agent, or Firm* — WRB-IP LLP

(57) ABSTRACT

An apparatus and method for substantially continuously manufacturing fuel cells are provided. Each cell generates electrical power from reactions of reactants therein. Each cell comprises component parts assembled and/or laminated together in a stacked configuration. The apparatus includes an assembly zone for receiving rolls of material and/or pre-formed component parts for fabricating the cells, and assembly devices for, commencing from a starting layer, progressively assembling and/or laminating layers of material and/or pre-formed component parts from the rolls to the starting layer to manufacture the fuel cells, a testing zone for applying a test procedure to the cells to identify functional cells thereof or parts thereof, the testing zone also including a fuel-cell repair function for recycling fuel cells, or parts thereof, found to be to be defective in response to applying the test procedure, a separating zone for mutually separating the functional cells into individual fuel cells, parts thereof or groups of such fuel cells, and a stacking zone for mutually assembling the functional fuel cells or the groups of such functional cells into stacks of such fuel cells to manufacture fuel cell packs.

7 Claims, 10 Drawing Sheets

(56) References Cited

U.S. PATENT DOCUMENTS

| | | |
|---|---|---|
| 2003/0221311 A1 | 12/2003 | Smith et al. |
| 2004/0161655 A1 | 8/2004 | Murphy et al. |
| 2004/0241525 A1 | 12/2004 | Mekala et al. |
| 2005/0136317 A1* | 6/2005 | Ferguson ................... 429/38 |
| 2006/0154117 A1* | 7/2006 | Toro .......................... 429/12 |
| 2006/0230816 A1* | 10/2006 | Buerkle et al. ............ 73/40.7 |

FOREIGN PATENT DOCUMENTS

| | | |
|---|---|---|
| WO | 9957781 A1 | 11/1999 |
| WO | 02069424 A1 | 9/2002 |
| WO | 03085759 A1 | 10/2003 |
| WO | 2004023578 A2 | 3/2004 |
| WO | 2004027910 A1 | 4/2004 |
| WO | 2005055349 A1 | 6/2005 |
| WO | 2006020412 A2 | 2/2006 |

OTHER PUBLICATIONS

European Search Report for corresponding EP 07 83 5157.
International Search Report for corresponding International Application PCT/SE2007/000957.
International Preliminary Report on Patentability for corresponding International Application PCT/SE2007/000957.

* cited by examiner

METHODS AND APPARATUSES FOR CONTINUOUS MANUFACTURING OF FUEL CELLS

The present application is the U.S. National Stage of PCT/SE2007/000957, filed Oct. 29, 2007, which is a continuation-in-part of PCT/SE2006/001236, filed Oct. 31, 2006, the disclosures of each of which are hereby incorporated by reference.

FIELD OF THE INVENTION

The present invention relates to methods of manufacturing fuel cells. Moreover, the present invention concerns fuel cells manufactured pursuant to the methods. Furthermore, the present invention also relates to configurations of such fuel cells mutually coupled together, for example in stacked configurations. Additionally, the present invention also relates to apparatus operable to implement the methods.

BACKGROUND OF THE INVENTION

A fuel cell is a device which is operable to receive a fuel reactant susceptible to being oxidized and an oxidizing agent reactant, and to oxidize the fuel reactant using the oxidizing reactant to directly generate useable electrical power; the fuel reactant is, for example, a hydrocarbon and/or hydrogen. Moreover, the fuel cell is attractive in that it is devoid of complex moving parts, for example in contradistinction to contemporary combustion engines which include rotating and/or reciprocating components susceptible to wear and noise generation. Furthermore, the fuel cell is potentially capable of being constructed so as provide sufficient electrical power for operating transport systems, emergency power supplies and similar.

In overview, several fuel cells are contemporarily connected together in various configurations to provide fuel cell packs which are operable to provide elevated electrical output potentials, for example 10's of volts. A schematic example of a fuel cell is indicated generally by 10 in FIG. 1. The fuel cell 10 includes an electrolyte 20. The electrolyte 20 is provided with at least one anode electrode 30 and at least one cathode electrode 40, such that the at least one anode electrode 30 is isolated spatially and electrically from the at least one cathode electrode 40. Optionally, the electrolyte 20 is implemented as a substantially planar panel having first and second principal surfaces 50, 60; however, alternative implementations of the electrolyte 20 are feasible. One or more cooling cells 70 are optionally included in the fuel cell 10 in relatively close proximity to the electrolyte 20 and are operable to maintain the fuel cell 10 at an optimal temperature in use the one or more cooling cells 70 are beneficially provided with fluid coolant flow therethrough for removing heat energy therefrom; such fluid can be a liquid or a gas. However, in the context of fuel cell technology, a term "fluid" is often used to specify a liquid.

When the fuel cell 10 is in operation, a first reactant 80 is directed to flow over an active region of the at least one anode electrode 30; moreover, a second reactant 90 is directed to flow over an active region of the at least one cathode electrode 40. An oxidizing reaction arising between the first and second reactants 80, 90 in a vicinity of the electrolyte 20, whereat the first reactant 80 is oxidized and the second reactant 90 is reduced, is operable to generate both positive and negative charges. The positive and negative charges have mutually different rates of propagation through the electrolyte 20, thereby causing a potential difference V to be generated between the at least one anode electrode 30 and at least one cathode electrode 40. Ideally, only protons are transported through the electrolyte 20 when the fuel cell 10 is implemented as a PEM-type fuel cell; "PEM" is an abbreviation for Proton Exchange Membrane. In such a PEM-type fuel cell, electrons complementary to the protons are then available for flowing in an external circuit.

The potential difference V enables an external current I to be extracted by a load L connected in operation between the at least one anode electrode 30 and at least one cathode electrode 40. The electrolyte 20 is susceptible to becoming less effective during use, for example due to increased charge resistance and/or resistance to ion transport therethrough, and areas of the electrodes 30, 40 are susceptible to become progressively less active. Moreover, the fuel cell 10 is susceptible to being operated at elevated temperatures, for example in a range of 80.degree. C. to 200.degree. C., which accelerates degradation of the fuel cell 10 due to ageing of its seals and corrosion of its component parts. Such degradation of fuel cell performance during operation dictates fuel cell replacement or repair after a given period of use which requires that fuel cell manufacturing costs are sufficiently competitive in comparison to alternative approaches to generate mechanical and/or electrical power from oxidation processes. Alternative approaches include, for example, internal combustion engines: optionally, the internal combustion engines are mechanically coupled to electrical generators for generating electricity.

Thus, fuel cells have a finite operating lifetime before their effectiveness to generate electrical power is directly diminished. In view of such finite operating lifetime, it is desirable to manufacture such fuel cells as efficiently and economically as possible so that they are capable of providing a commercially competitive solution to other devices capable of generating useable power from fuel oxidation, for example hydrocarbon and/or hydrogen oxidation.

It is known from a published PCT patent application no. WO2004/027910 to manufacture a fuel cell by stacking component parts together. The components are designed so that, when assembled together, they cooperate to provide channels. Flows of reactants are directed in operation through the channels to pass active surfaces of electrodes. Moreover, optionally, flows of cooling fluid are directed through other of the channels to codling cells which are operable to remove heat energy from the fuel cell. The components are implemented as planar parts which are potentially delicate to handle during manufacture and which need to be mutually aligned and overlaid when fabricating the aforesaid fuel cell. Such handling of components is an at least partially serial assembly process which is time consuming and hence represents a costly manner of manufacture. Moreover, when progressively more such components are assembled together into a stacked configuration, there is progressively more effective investment vested in the stacked configuration. Furthermore, a risk that one or more of the components are incorrectly mutually positioned or that at least one of the components is defective increases as the stacked configuration includes more components. Disassembly of the stacked configuration to replace a defective component therein is often commercially unattractive and can therefore risk generating expensive waste.

In a United States patent application no. US 2003/0221311, there is described a method of assembling components of a membrane electrode sealed assembly. The method includes:

(a) a first step of unrolling a first cell section from a gasket roll;

(b) a second step of aligning a first cell section of a first gas diffusion layer with the first cell section of the first gasket roll;

(c) a third step of aligning a first cell section of a membrane layer with the first cell section of the first gas diffusion layer;

(d) a fourth step of aligning a first cell section of a second gas diffusion layer with the first cell section of the membrane layer;

(e) a fifth step of locating a first catalyst layer on one of the membrane layer and the first gas diffusion layer prior to the first cell section of the membrane layer being aligned with the first cell section of the first gas diffusion layer;

(f) a sixth step of locating a second catalyst layer on one of the second gas diffusion layer and the membrane layer prior to the first cell section of the second gas diffusion layer being aligned with the first cell section from the second gasket roll; and (g) a seventh step of aligning the first cell section from the second gasket roll with the first cell section of the second gas diffusion layer. The aforementioned US patent application also discloses variants of the method but all involve considerable working of the membrane during fabrication of a membrane electrode sealed assembly.

The method described in the aforesaid published United States patent has associated therewith certain technical problems. A first problem is that the membrane web is introduced in step (d) and is thereby susceptible to being stressed when other parts are later bonded thereto. Moreover, the method is not a completely continuous process for fuel cell manufacture as certain molding operations are involved which potentially limit manufacturing throughput. Furthermore, the method is essentially without feedback to cope with potential defects arising during fabrication of the membrane layer with its associated catalysts.

SUMMARY OF THE INVENTION

It is desirable to provide an improved method of manufacturing fuel cells which is capable of reducing manufacturing cost and enhancing fuel cell reliability and performance.

According to a first aspect of the present invention, there is provided a method of manufacturing fuel cells: there is provided a method of substantially continuously manufacturing fuel cells operable to generate electrical power from reactions of one or more reactants therein, wherein each fuel cell comprises a plurality of component parts assembled and/or laminated together in a stacked configuration, the method including steps of:

(a) providing a plurality of rolls (R1, R2, R3, R4, R5, R6, R7) of material and/or pre-formed component parts for fabricating the fuel cells;

(b) in a substantially continuous manner, progressively assembling and/or laminating layers of material and/or pre-formed component parts from the plurality of rolls (R1, R2, R3. R4, R5, R6, R7) to fabricate a series of the fuel cells or parts of the fuel cells; and (c) mutually separating the one or more functional fuel cells into individual fuel cells, parts of the fuel cells or groups of such fuel cells for subsequent use, characterized in that assembly in step (b) is commenced from a layer providing each fuel cell with structural rigidity.

The invention is of advantage in that the method is capable of reducing manufacturing cost and enhancing fuel cell reliability and performance.

Optionally, in the method, the layer providing structural rigidity is a substantially rigid central structural layer of each of the fuel cells, or is a central chamber of each of the fuel cells.

Building up the fuel cells from their central layers or central chambers is capable of resulting in fuel cells which are more robust and better able to maintain their dimensional stability, namely spatial and mechanical stability, when subject to temperature and/or pressure differentials arising therein during use. Thus, the method takes into account:

(1) temperature gradients arising in response to reaction of the reactants within the fuel cells;

(2) thermal conductivity properties associated with the design of the fuel cells;

(3) pressure gradients arising in the fuel cells dependent upon flow field configurations employed within the fuel cells; and (4) fuel and oxidant supply systems outside the fuel cell.

Optionally, the method includes a step of applying a testing procedure to the series of the fuel cells, or parts of the fuel cells, to identify one or more functional fuel cells or parts thereof.

More optionally, the method includes steps of:

(a) applying a repairing procedure to the series of the fuel cells, or parts of the fuel cells, found to be defective during testing; and (b) reusing in fuel cell manufacture one or more functional fuel cells, or parts thereof, which have been recovered and/or repaired.

Optionally, step (b) of the method involves supplying layers of material and/or pre-formed component parts to one or more preparatory processes before and/or whilst being assembled and/or laminated to form the series of fuel cells. The one or more preparatory processes are efficiently executed when implementing the method so that more standard materials can be potentially used at the rolls, for example a standard sheet metal strip or metallic web can be utilized which is subsequently adapted by the one or more preparatory processes to render it suitable for fuel cell manufacture.

More optionally in the method, the one or more preparatory processes include one or more of:

(e) bonding or molding gaskets or seals to one or more of the layers of material and/or pre-formed component parts;

(f) mechanically working one or more of the layers of material and/or component parts to shape them and/or to flatten them;

(g) cutting one or more apertures or holes in one or more of the layers of material and/or component parts;

(h) treating cut edges of one or more of the layers and/or component parts to passivate them from corrosion or chemical reaction with one or more of the reactants;

(i) adding coatings to one or more of the layers and/or component parts to activate and/or passivate them;

(j) cutting or otherwise releasing one or more of the layers and/or components to release them from their respective rolls;

(k) grinding and/or polishing surfaces of one or more of e layers of material and/or pre-formed component parts;

(l) electro-polishing one or more of the layers of material and/or pre-formed component parts for enhancing their corrosion protection and/or for providing them with a smooth surface operable to exhibit lower electrical contact resistance;

(m) cleaning one or more of the layers of material and/or pre-formed component parts for removing contamination therefrom; and (n) applying a welding operation to one or more of the layers of material and/or pre-formed component parts. Laser welding is susceptible to forming reactant flow field configurations within the fuel cells for enhancing their electrical power output capability and/or providing reduced flow resistance for reactants therethrough.

Optionally, step (c) of the method includes at least one testing operation including one or more of:

(o) testing the fuel cells by applying thereto a fluid under excess pressure to pressure test the fuel cells and identify any occurrence of leaks therein;

(p) testing the fuel cells by weighing them to determine whether or not their weight is within a given range, or above and/or below a given threshold weight;

(q) testing the fuel cells by measuring one or more physical dimensions thereof to determine whether or not the fuel cells have each been correctly assembled together;

(r) testing the fuel cells by optically interrogating the fuel cells to ensure that their layers and/or component parts have been correctly mutually aligned;

(s) testing the fuel cells by performing one or more electrical measurements thereon to determine open circuit faults, short circuit faults and/or cell resistance faults;

(t) testing the fuel cells by applying "sniffing" or chemical detection tests thereto for detecting trace quantities of undesirable substances remaining from fuel cell manufacturing processes; and (u) testing the fuel cells to test for leaks between electrode compartments included within the fuel cells, the testing including further steps of plugging outlets of electrodes of the electrode compartments, supplying reactants to the electrode compartments and monitoring output potentials generated by the fuel cells;

(v) leak testing the fuel cells by applying sniffing gases and/or tracer gases under excess pressure, for example the gases being preferably 5% hydrogen in nitrogen, and detecting any leaks of the sniffing gases and/or trace gases from the fuel cells to their surroundings by using gas sensing apparatus;

(w) testing pressure drop occurring in fuel cell components, half fuel cells or complete fuel cells in response to flow of a liquid and/or gas therethrough; and (x) testing flow signatures of fuel cell components, half fuel cells or completed fuel cells in response to a flow of a liquid and/or gas therethrough.

Aforesaid sniffing gases can be implemented using helium, or a mixture of hydrogen diluted in nitrogen. More preferably, a mixture of substantially 5% hydrogen diluted in nitrogen is employed.

Testing the individual fuel cells prior to assembly into corresponding stacks of fuel cells enables faulty or suspect fuel cells to be identified and discarded so that they are not assembled into corresponding stacks; dismantling and repair of stacks of fuel cells on account of incorporation of a faulty fuel cell therein is both expensive and time consuming and potentially also generates waste in manufacture; the present invention is capable of circumventing such unnecessary waste and expense.

Such tracer gas testing is of benefit in that it provides feedback regarding reliability of continuous lamination and assembly processes utilized when implementing the method. In steps (t) and (v) sniffing gases such as helium, or a mixture of hydrogen diluted in nitrogen can be beneficially employed; preferably, a mixture of substantially 5% hydrogen diluted in nitrogen is employed.

In step (o), each fuel cell is beneficially tested to identify leaks between anode and cathode electrodes, for example in a membrane fabricated into the fuel cells and/or in a reactant flow distribution arrangement fabricated into the fuel cells; such testing is optionally performed by applying a relatively small and variable first excess pressure by way of a first gas into a first electrode reactant chamber of each fuel cell, and relatively small and variable second excess pressure by way of a second gas into a second electrode reactant chamber of each fuel cell, and then detecting occurrence of mixing due to one or more leaks of the first and second gases. Beneficially, the first and second gases are hydrogen and nitrogen respectively. Moreover, the first and second excess pressures are optionally mutually dissimilar.

In step (v), such leak testing is susceptible to being performed for dry, humidified, saturated and over-saturated sniffing and/or tracer gases. Moreover, such leak testing is optionally also performed with heated gases, beneficially below a temperature of 100.degree. C. Furthermore, temperature and humidity measurement of sniffing and/or tracer gases flowing through the fuel cells from input to output is also susceptible to being used for testing purposes. By performing such leak testing, it is feasible to confirm whether or not fuel cell components are mutually placed correctly, whether or not all components are present, whether or not geometrical dimensions of the components are correct, whether or not fuel cell components and fuel cells have a correct degree of heat loss therefrom, and whether or not the components are fabricated from suitable materials and so forth. There is thereby provided a component fail indicator.

In step (x), by applying a testing gas, preferably comprising inert gases or air, to an inlet of fuel cell components, half fuel cells or complete fuel cells, an outlet flow thereof will have different signature regarding its flow field pattern signature; this signature is susceptible to being known for each fuel cell component, half fuel cell or complete fuel cell. This signature if beneficially tested as a function of flow rate and/or by applying flow pulses at various repetition frequencies. Moreover, such testing is susceptible to being performed using dry, humidified, saturated and over-saturated gases, for example such testing is optionally performed while the temperature of the fuel cell is varied to determine the degree of condensation of water in the inlet and outlet flow sections and in the flow field of the bipolar plate. The temperature and humidity of gases at the inlet and outlet flow are susceptible to being measured and used as a component fail indicator. Such measurements are susceptible to providing important information about the components, half fuel cells or complete fuel cells. By performing these tests, it is feasible to confirm whether or not components are correctly mutually placed, whether or not all components are included, whether or not dimensions of components or fuel cells are correct and whether or not a flow distribution over an active area for a fuel cell is correct and so forth. Again, such signature testing is susceptible to being used as a component fail indicator.

More optionally, step (o) or step (v) of the method includes steps of:

(y) applying a tracer gas under excess pressure to each fuel cell; and (z) spatially sampling using one or more tracer gas probes around an external periphery of each fuel cell to check for local leakage of the tracer gas therefrom. Such an approach is, for example, beneficial for testing peripheral polymeric seals used in fuel cell manufacture. Moreover, leaks in peripheral welded joints are also susceptible to being identified by the approach.

More optionally, step (r) of the method includes one or more steps of:

(aa) optically interrogating the fuel cells using one or more optical radiation beams around a peripheral region of each fuel cell and/or whereat aperture and/or holes are formed into the fuel cells; and (bb) executing imaging of layers and/or component parts included in each fuel cell using (Rontgen) X-rays to detect faults or defects arising therein during fabrication.

Such optical and/or X-ray inspection is capable of identifying potentially unreliable or suspect fuel cells to avoid them being assembled into stacks of fuel cells, thereby improving operating reliability of such stacks.

Optionally, the method includes a step of mutually synchronizing delivery of material and/or components parts from the plurality of rolls (R1, R2. R3, R4, R5, R6, R7) for ensuring mutually accurate alignment thereof in the fuel cells. Synchronizing delivery of material and/or component parts is of benefit in that mutual alignment of layers in the fuel cells is improved so that various holes, channels and chambers formed in the fuel cells provide less flow resistance to the one or more reactants, and so that a risk of leakage oh the one or more reactants at peripheral edges of the fuel cells is also reduced.

Optionally, the method includes steps of forming holes, channels and chambers in the material and/or components parts so as to provide the fuel cells with one or more paths through which the one or more reactants are operable to flow when the fuel cells are in operation.

Optionally, steps of the method involving forming the holes, channels and chambers are such so as to enable the fuel cells to be assembled into corresponding stacks of fuel cells, each stack being susceptible to being terminated by one or more end plates at which electrical connections and fluid and/or gas connections are provided.

Optionally, the method is susceptible to being implemented to fabricate a fuel cell comprising a membrane, a cathode electrode layer, and an anode electrode layer, wherein the assembly either of the membrane or of the membrane together with at least one of the electrode layers or of one of the electrode layers is the last layer or last combination of layers provided for assembly in the assembling and/or laminating process.

According to a second aspect of the invention, there is provided a method: there is provided a method of substantially continuously manufacturing fuel cells operable to generate electrical power from reactions of one or more reactants therein, wherein each fuel cell comprises a plurality of component parts assembled and/or laminated together in a stacked configuration, the method including steps of:

(a) providing a plurality of rolls (R1, R2, R3, R4, R5, R6, R7) of material and/or pre-formed component parts for fabricating the fuel cells or parts thereof;

(b) in a substantially continuous manner, progressively assembling and/or laminating layers of material and/or preformed component parts from the plurality of rolls (R1, R2, R3, R4, R5, R6, R7) to manufacture a series of the fuel cells or parts thereof; and (c) mutually separating the one or more functional fuel cells into individual fuel cells, parts thereof or groups of such fuel cells for subsequent use, characterized in that the method includes steps of:

(d) applying a testing procedure to the series of the fuel cells or parts of the cells to identify one or more functional fuel cells or parts thereof;

(e) applying a repairing procedure to the series of the fuel cells or parts of the cells found to be defective during testing; and (f) reusing in fuel cell manufacture one or more functional fuel cells or parts thereof which have been recovered and/or repaired.

Optionally, in step (b) of the method, assembly commences from a layer providing each fuel cell with structural rigidity, the layer being a substantially central rigid structural layer of each of the fuel cells, or a central chamber of each of the fuel cells.

According to a third aspect of the invention, there is provided an apparatus: there is provided an apparatus operable to substantially continuously manufacture fuel cells operable to generate electrical power from reactions of one or more reactants therein, and wherein each fuel cell comprises a plurality of component parts assembled and/or laminated together in a stacked configuration, the apparatus including:

(a) an assembly zone comprising a mounting arrangement for receiving a plurality of rolls (R1, R2, R3, R4, R5, R6, R7) of material and/or pre-formed component parts for fabricating the fuel cells or parts thereof, and one or more assembly devices operable, in a substantially continuous manner, to progressively assemble and/or laminate layers of material and/or pre-formed component parts from the plurality of rolls (R1, R2, R3, R4, R5, R6, R7) to manufacture a series of the fuel cells or a series of parts therefore;

(b) a testing zone for applying a test procedure to the series of the fuel cells or parts thereof to identify one or more functional fuel cells thereof or parts thereof;

(c) a separation zone operable to mutually separate the one or more functional fuel cells into individual fuel cells, parts thereof or groups of such fuel cells; and (d) a stacking zone for mutually assembling the functional fuel cells or the groups of such functional fuel cells into stacks of such fuel cells to manufacture packs of such fuel cells, characterized in that assembly in the assembly zone is commenced from a layer providing each fuel cell with structural rigidity.

Optionally, the apparatus includes one or more preparatory stages operable to receive layers of material and/or pre-formed component parts from the rolls (R1, R2, R3, R4, R5, R6, R7) for preparatory processing prior to and/or whilst being assembled and/or laminated to form the series of fuel cells.

According to a fourth aspect of the invention, there is provided an apparatus which is operable to substantially continuously manufacture fuel cells operable to generate electrical power from reactions of one or more reactants therein, and wherein each fuel cell comprises a plurality of component parts assembled and/or laminated together in a stacked configuration, the apparatus including:

(a) a mounting arrangement for receiving a plurality of rolls (R1, R2, R3, R4, R5, R6, R7) of material and/or pre-formed component pans for fabricating the fuel cells or parts thereof;

(b) one or more assembly devices operable, in a substantially continuous manner, to progressively assemble and/or laminate layers of material and/or pre-formed component parts from the plurality of rolls (R1, R2, R3, R4, R5, R6, R7) to manufacture a series of the fuel cells or a series of parts of the fuel cells; and (c) a separating facility operable to mutually separate the one or more functional fuel cells into individual fuel cells, parts thereof or groups of such fuel cells for subsequent use, characterized in that the apparatus is operable;

(d) to apply a testing procedure to the series of the fuel cells or parts of the cells to identify one or more functional fuel cells or parts thereof;

(e) to apply a repairing procedure to the series of the fuel cells or parts of the cells found to be defective during testing; and (f) to reuse in fuel cell manufacture one or more functional fuel cells or parts thereof which have been recovered and/or repaired.

Optionally, in the apparatus, assembly of the one or more assembly devices is commenced from a layer providing each fuel cell with structural rigidity. More optionally, when the apparatus is operable to manufacture fuel cells, the layer is a substantially rigid central structural layer of each of the fuel cells, or a central chamber of each of the fuel cells.

According to a fifth aspect of the invention, there is provided a method of manufacturing fuel cells wherein each fuel cell comprises a plurality of component parts assembled and/or laminated together in a stacked configuration and forming at least one cooling chamber and at least one electricity producing basic fuel cell, the method including steps of:

(a) progressively assembling and/or laminating layers of material and/or pre-formed component parts to manufacture a series of the fuel cells or parts of the fuel cells, and (b) starting the assembling and/or laminating process with a layer processed in the process to form a part of the cooling chamber, characterized in that the method includes a step of at least substantially completing manufacturing of the cooling chamber before the manufacturing of the basic fuel cell is started.

Optionally, when implementing the method, the various layers of the fuel cell are provided sequentially during the assembling and/or laminating process in such a way that the assembled layers of the fuel cell form a sandwich structure with the layers of the cooling chamber arranged between the layers of the basic fuel cell.

Optionally, when implementing the method, the various layers of the fuel cell are provided sequentially during the assembling and/or laminating process in such a way that the assembled layers of the fuel cell form a sandwich structure with the group of layers of the cooling chamber and the group of layers of the basic fuel cell are arranged adjacent to each other.

Optionally, when implementing the method, there is manufactured a basic fuel cell comprising a membrane, a cathode electrode layer, and an anode electrode layer, wherein the assembly either of the membrane or of the membrane together with at least one of the electrode layers or of one of the electrode layers is the last layer or last combination of layers provided for assembly in the assembling and/or laminating process.

According to a sixth aspect of the invention, there is provided a fuel cell fabricated using a method pursuant to the first, second or fifth aspect of the invention.

According to a seventh aspect of the invention, there is provided a fuel cell fabricated by the apparatus pursuant to the third or fourth aspect of the invention.

It will be appreciated that features of the invention are susceptible to being combined in any combination without departing from the scope of the invention as defined by the accompanying claims.

DESCRIPTION OF THE DIAGRAMS

Embodiments of the present invention will now be described, by way of example only, with reference to the accompanying drawings wherein:

FIG. 2b is a cross-sectional illustration of a manner of functioning of a fluid seal optionally employed within the fuel cell of FIG. 2a;

FIG. 3b is a schematic illustration of an alternative implementation of the apparatus of FIG. 3a;

FIG. 3c is a schematic illustration of a further alternative implementation of the apparatus of FIG. 3a;

Figure 1:
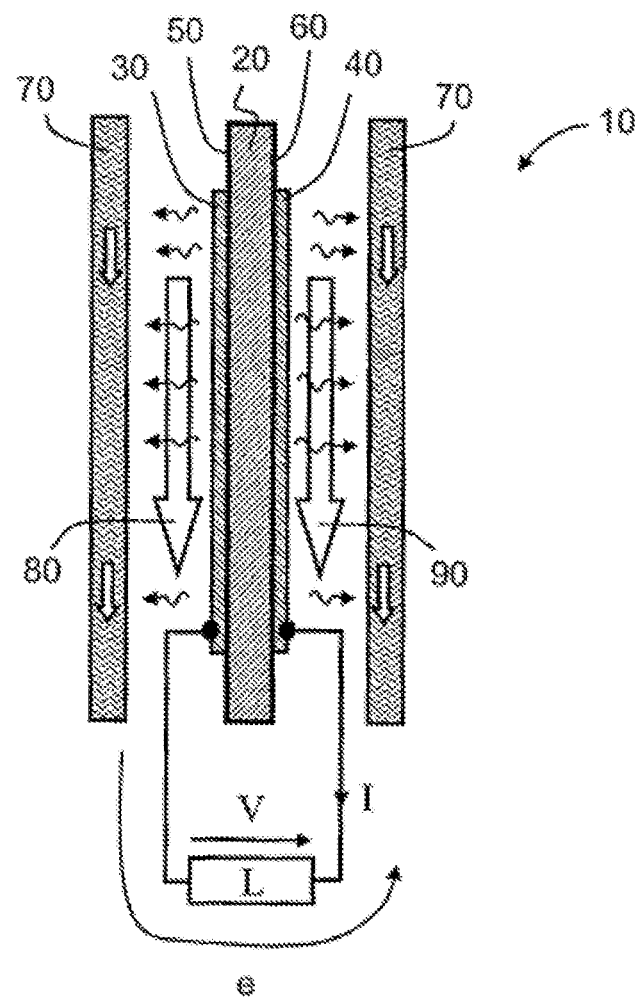
FIG. 1 is a schematic illustration of a known fuel cell.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE INVENTION

In overview, the present invention is concerned with:

(a) methods of manufacturing fuel cells;

(b) fuel cells manufactured using such methods; and (c) apparatus for use in implementing such methods of manufacturing fuel cells.

As will be elucidated in more detail later, the methods described hereafter are susceptible to fabricating fuel cells which are potentially generally more reliable then fuel cells hitherto manufactured using contemporary at least partially continuous manufacturing processes as elucidated in the foregoing. Moreover, the apparatus for implementing the methods described hereafter is susceptible to operating in a more continuous manner for enhancing manufacturing throughput and hence reducing fuel cell manufacturing cost. Such increased reliability is achieved by substantially constructing fuel cells outwards from their centers so that stresses are mutually balanced; however, construction of fuel cells from layers other than their central structural layer is also optionally feasible pursuant to the present invention. Moreover, the present invention is also distinguished in that a proton exchange member (PEM) is included relative late during continuous fuel cell fabrication in order to reduce a risk of the membrane being stressed during fuel cell fabrication steps; by such an approach, a yield of functional fuel cells is susceptible to being increased. Additionally, throughput is enhanced by using a substantially completely roll-based manufacturing approach into which testing is included on a continuous basis; the testing is of benefit in that faulty fuel cells can be identified before they are assembled into stacks of fuel cells, thereby circumventing a need to disassemble or discard complete stacks of fuel cells which represent significant added-value devices. Associated with testing, one or more repair operations are also susceptible to being applied to reduce waste material from such continuous fuel cell manufacture; repair operations include, for example, repair of pinhole leaks in the proton exchange membrane (PEM) and on-line reworking of seals at gaskets and similar.

Embodiments of the present invention will now be described. Firstly, referring to FIG. 2a, there is shown a cross-section of a part of fuel cell stack manufactured according to the method of the present invention. The fuel cell stack is indicated generally by 100 and includes a plurality of individual fuel cells 110, one of which is shown completely in the FIG. 2a including a cooling chamber together with a part of an adjacent fuel cell. The individual fuel cell 110 includes a first structural plate 120 onto which a packing material plate 132 with associated sealing gaskets 130, 135 is applied leaving a void filled by a metallic cooling mesh 140. Abutting onto the cooling mesh 140 and the sealing gasket 130 is a second structural plate 150, optionally, the first and second structural plates 120, 150 are substantially similar in construction, for example fabricated from stainless steel or aluminum sheet having a thickness in a range of circa 50 m to circa 250 m. The aforesaid void filled by the cooling mesh 140 is operable to form a cooling cell of the fuel cell 110; the cooling mesh 140 is thus operable to occupy a cooling chamber of the fuel cell 110.

Onto a major face of the second structural plate 150 remote from the aforesaid void is a first gas net 170 and deposited thereon a first mesh 180 which abuts onto a proton exchange membrane denoted by 190; a cathode electrode layer is included between the first mesh 180 and the proton exchange membrane 190. The first mesh 180 is, for example, fabricated from at least one of: woven graphite cloth, graphite/carbon paper, a gas diffusive material, a ceramic material, an electrically conductive ceramic material, a micro-porous material, a collection of mutually bonded fibers, beneficially, the first mesh 180 is implemented to be electrically conductive in operation; the first mesh 180 is susceptible to being implemented in woven or non-woven form, for example the first mesh 180 can be of interleaved woven form or as a compressed mass of randomly orientated fibers, for example graphite fibers. The exchange membrane 190 is preferably fabricated from a fluorinated proton/ion-conductive plastics material, although other materials capable of selective charge carrier transport therethrough can potentially be employed in substitution. A gasket seal 160 ensures that a first fuel cell chamber comprising the first gas net 170 and the first mesh 180 is fluid-tight for receiving a flow of a first reactant in operation.

On a major face of the membrane 190 remote from the first fuel cell chamber is included in sequence a second mesh 200 and thereafter a second gas net 210; an anodic electrode layer is included between the proton exchange membrane 190 and the second mesh 200. The second mesh 200 is beneficially implemented in a substantially similar manner to the first mesh 180, for example utilizing woven graphite cloth. The second gas net 210 is arranged to abut onto an adjoining face of a structural plate 230 of an adjoining fuel cell: the structural plate 230 is optionally a repetition of the aforesaid first structural plate 120. Moreover, the second mesh 200 and the second gas net 210 define a second fuel cell chamber provided with a gasket seal 220 for ensuring that the second chamber is fluid-tight for receiving a flow of a second reactant in operation.

The fuel cell 110 is susceptible to being built up into parallel and/or series combinations of such cells for achieving greater output potentials and/or greater current supplying capabilities. Optionally, the gasket seals 160, 220 can be fabricated from silicone, solidified thermo-adhesives or thermo-setting adhesives; however, other implementations of the seals 160, 220 are also feasible. More beneficially, the gasket seals 160, 220 each comprise a two part configuration as depicted inset in FIG. 2b, wherein a seal is indicated by 250 and includes a relatively harder spacer portion 260 and the relatively more resilient or elastic fluid sealing portion 270a. As neighboring surfaces are mutually compressed towards one another when fabricating the fuel cell 110, the elastic sealing portion 270a is progressively deformed as depicted in 270b, 270c so as to provide a reliable fluid seal whilst providing a defined separation between the neighboring surfaces on account of the harder spacer portion 260. The seal depicted in FIG. 2b progressively deforms in use when pressure is applied thereto until the harder spacer portion 260 defines a separation distance "d" ultimately achieved. Optionally, one or more of the nets 170, 210 are susceptible to being fabricated to be of similar area to the structural plates 120, 150 and impregnated around their peripheral edge with a gasket sealing material, thereby being able to function as both nets and seals. Extending the nets 170, 210 out to a periphery of the fuel cell 110 by forming a peripheral seal therearound is of benefit in that exposed cut edges of the nets 170, 210 are not exposed within the fuel cell 110, wherein these cut edges are often prone to becomes cites of corrosion in operation.

Secondly, apparatus for implementing methods of the invention will now be elucidated. Modes of operation of such apparatus will also be described.

Figure 3A:
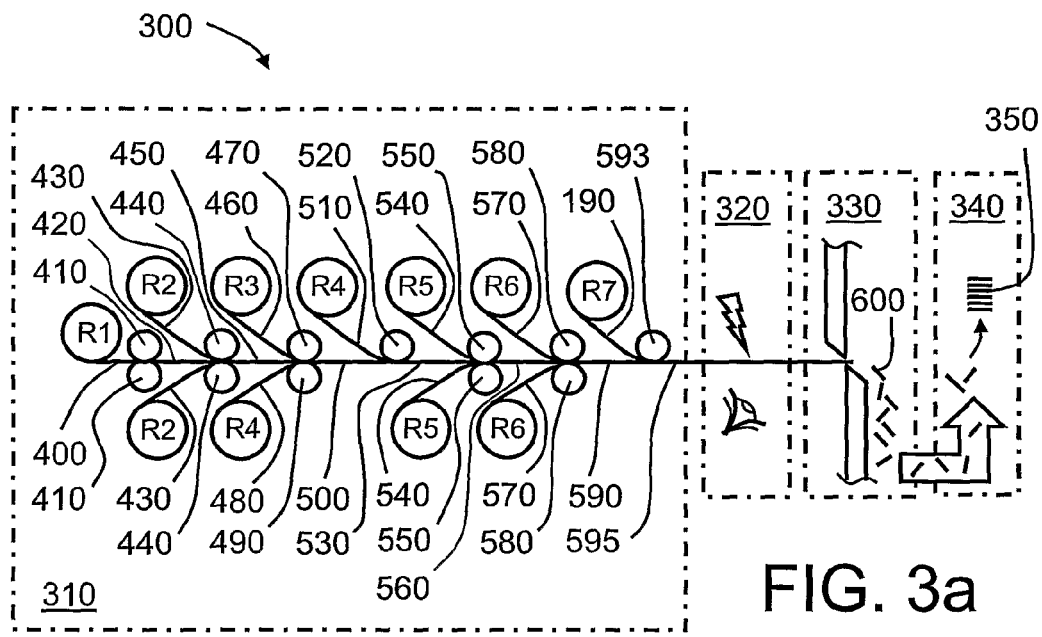
FIG. 3a is a schematic illustration of an apparatus operable to manufacture fuel cells pursuant to the present invention.

Referring to FIG. 3a, an apparatus for manufacturing fuel cells is indicated generally by 300. The apparatus 300 comprises a continuous roll-based fuel-cell assembly zone 310, a fuel-cell testing station 320, a separating station 330 and a stacking station 340 for assembling single fuel cells or groups of fuel cells together to provide individual stacks of fuel cells 350. The stacks of fuel cells 350 are also conveniently referred to as fuel-cell packs. Optionally, the fuel-cell packs comprise a plurality of fuel cells coupled electrically in series so as to provide a greater output potential when in operation. However, other series-parallel configurations of fuel cells are also possible. Although the apparatus 300 is illustrated as having specific zones and stations, it will be appreciated that one or more of the zones and stations 310, 320, 330, 340 can be effectively distributed to several spatial locations within the apparatus 300 or implemented concurrently; for example, testing procedures associated with the testing station 320 can also be partially implemented if required in at least one of the assembly zone 310, the separating station 330, or the stacking station 340, or in between the stations 330, 340. Optionally, the fuel-cell assembly zone 310 includes testing apparatus for testing component parts of the fuel cells as they are continuously produced, together with repair apparatus for reapplying seals, repairing seals, as well as sealing pin-hole leakages in the membrane 190. Waste generated by the apparatus 300 is thereby susceptible to being substantially eliminated.

In overview, in the fuel-cell assembly zone 310, layers of material for fabricating fuel cells are provided in rolls denoted by R1 to R7. Optionally, certain of the layers are pre-patterned in various forms as will be further elucidated later. Material is continuously provided in an automated manner from the rolls R1 to R7 so that a continuous stream of assembly fuel cells are conveyed from the assembly zone 310 to the testing station 320 whereat various tests are performed to verify operational integrity of the automatically assembled fuel cells. Fuel cells at the testing station 320 which are found to be defective are marked or otherwise recorded so that they are not assembled into stacks of fuel cells 350, thereby avoiding fabrication of stacks of fuel cells 350 which are non-functional or with an impaired function and thus enhancing production yield. Optionally, defective fuel cells are collected and subsequently repaired in a subsidiary production facility complementary to the apparatus 300; repaired fuel cells are then fed back into the apparatus 300 in order to substantially eliminate waste from the apparatus 300 in operation.

The aforesaid rolls R1 to R7 are disposed such that:

(a) the roll R1 includes sheet material which is optionally electrically conductive and which is operable in fuel cells to function as packing material, for example as the packing material plate 132, namely a rigid structural component of fuel cells; optionally, the material from the roll R1 has apertures formed thereinto providing coupling lugs therearound linking between adjacent fuel cells being sequentially fabricated along the assembly zone 310, these lugs are susceptible to being severed when assembled fuel cells are mutually separated from one another;

(b) the rolls R2 include sealing gasket material which is operable in fuel cells to function as gas and/or fluid gaskets, for example the gasket seals 130, 135;

(c) the roll R3 includes material operable in fuel cells to function as cooling nets, for example as the metallic cooling mesh 140;

(d) the rolls R4 include material operable in fuel cells to function as structural plates, for example as the structural plates 120, 150;

(e) the rolls R5 include material operable in fuel cells to function as gas nets, for example as the gas nets 170, 210; however, it should be noted that first gas net 170 supplied by the upper roll R5 in the FIG. 3*a* will form a part of a first fuel cell and the second gas net 210 supplied simultaneously by the lower roll R5 will form part of a second fuel cell adjacent to the first one;

(f) the rolls R6 include material operable in fuel cells to function as gasket seals and/or packings, for example as the gasket seals 160, 220; however, it should be noted that gasket seal 160 supplied by the upper roll R5 in the Figure will form a part of a first fuel cell and the gasket seal 220 supplied simultaneously by the lower roll R6 will form part of a second fuel cell adjacent to the first one;

(g) the roll R7 includes material operable in fuel cells to function as an ion transport membrane or electrolyte, for example as the membrane 190 and its associated meshes 180, 200 and electrodes.

Significantly, the roll R7 continuously providing the membrane 190 is a last roll present in the apparatus 300 such that the membrane 190 is added last. Such an order of assembly is beneficial in that the membrane 190 is extremely delicate, for example in a range of 25 m to 100 m thick, and is coated in costly catalyst material, for example platinum and rhenium. Damage to this delicate membrane 190 is susceptible not only to render its associated fuel cell defective, but also to render a stack of fuel cells including one or more defective fuel cells non-functional. However, damage to the delicate membrane 190 is also susceptible to causing expensive waste from the apparatus 300. In order to mitigate such waste, the apparatus 300 includes one or more inspection and/or testing devices which are operable to inspect and detect pinholes present in the membrane 190 continuously during its delivery from the roll R7, as well as one or more repair devices for selectively applying repair material locally onto regions of the membrane 190 whereat pin-holes are detected. The repair material is beneficially a polymeric plastics material; optionally the repair material is allied together with a bonding agent for more effectively penetrating into the pin-holes and sealing the pin-holes. Although application of the repair material potentially reduces an active area of catalyst on the membrane 190, a reduction of potentially only a fraction of a percent of a total area of the membrane 190 included in a completed fuel cell eventually results from such repair and is often quite acceptable when such repair is executed spatially selectively, the reduction is within a range of variation of differential ageing characteristics of the membranes 190 of fuel cells in an assembly fuel cell stack after several weeks of use. An advantage with performing on-line continuous repair of the membrane 190 supplied from the roll R7 in FIG. 3*a* is that manufacture of fuel cells from the apparatus 300 need not be interrupted on account of problems arising with un-corrected defects present in the membrane 190; without such repair, if the membrane 190 supplied from the roll R7 were found to contain occasional pin-holes, operation of the apparatus 300 would need to be halted for exchange the roll 7 which would represent expensive down-time, not to mention a roll of unusable membrane material. The present invention is potentially able to avoid such a scenario occurring in practice. Beneficially, the membrane 190 on the roll R7 is supplied to a sufficient quality so that pin-hole defects do not arise therein; however, pin-holes inevitable arise in practice and an associated cost of subsequently dismantling a stack of fuel cells merely because one fuel cell 600 therein has a pin-hole defect represents a significant loss and hence it is often not sufficient to rely on an intrinsic integrity of the membrane 190 as supplied from the roll R7.

An alternative or additional refinement of the apparatus 300 concerns testing the membrane 190 from the roll R7 for pin-hole defects and selectively cutting the membrane 190 for inclusion in fuel cells to avoid including any detected pin-holes in the leaves of membrane 190 included in the fuel cell 600, for example by selectively advancing the membrane 190 as supplied to the roller 593 to avoid the pin-holes being included in fabricated fuel cells 600.

Pin-holes in the membrane 190 are potentially a problem because fuel and oxidant are susceptible to mixing locally in the vicinity of the pin-hole and causing a strong local chemical reaction thereat which is susceptible to enlarging the pin-hole when its corresponding fuel cell is in use. Eventually, pin-holes can enlarge with time as a corresponding fuel cell 600 is used until catastrophic failure of the fuel cell 600 occurs, rendering its entire stack 350 of fuel cells defective.

A further problem which can arise with the membrane 190 supplied from the roll R7 is that catalyst material from a first side of the membrane 190 is electrically shorted through to a catalyst material on a second side of the membrane 190, thereby causing an at least partial short circuit across the membrane 190. When the short circuit is within a range of resistance, a potential difference developed across the fuel cell 600 in use is susceptible to resulting in a parasitic current flow through the partial short circuit which causes local heating thereat and further damage to the membrane 190 in use, for example local melting of the membrane 190 around the pin-hole. In order to try to reduce such problems affecting fuel cell yield, testing and repair apparatus is beneficially included between the roll R7 and the roller 593 to detect and repair and/or circumvent any pin-holes present in the membrane 190. Such repair can include, for example, selectively removing a region of the membrane whereat the short circuit arises and then sealing the region of the membrane by applying a repair patch thereover.

Figure 3B:
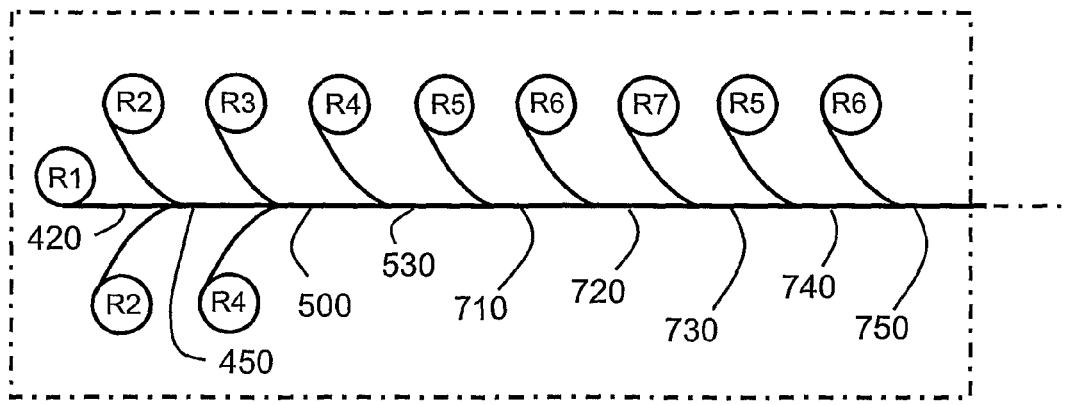

The apparatus according to FIG. 3*a* is arranged to start assembly from the packing material plate 132 and extends from there in both layer directions: 132 to 135 to 120 and 132 to 130 to 150 and to 140 as a single step providing the cooling mesh 140. As a result of such steps in the assembly procedure, the core fuel cell 170, 160, 180, 190, 200, 210, 220 is assembled symmetrically on top and from underneath the rigid layer structure 120, 135, 132, 130, 150, namely from a substantially central layer. However, it is split in such a way that the lower part 170, 160, 180, 190 of a first fuel cell is assembled on top of the rigid layer structure 120, 135, 132, 130, 150, and the upper part 210, 220 without the sensitive membrane-mesh structure 180, 190, 200 of a second fuel cell is assembled below the rigid layer structure 120, 135, 132, 130, 150. By stacking two such layer structures a complete fuel cell plus cooling chamber and a second half fuel cell will be formed. Alternatively, as shown in FIG. 3*b*, the complete fuel cell layer structure 170, 160, 180, 190, 200, 210, 220 is assembled only from one side on top of the cooling chamber layer structure 120, 135, 132, 130, 150, 140. Yet alternatively, as shown in FIG. 3c, the complete fuel cell structure is fabricated starting from the first structural plate 120 and building up layers in one direction, with the membrane 190 being added relatively late in the continuous fabrication process illustrated; the first structural plate 120 is relatively strong and thereby forms a strong foundation on which to lay the membrane 190 later.

Figure 3C:
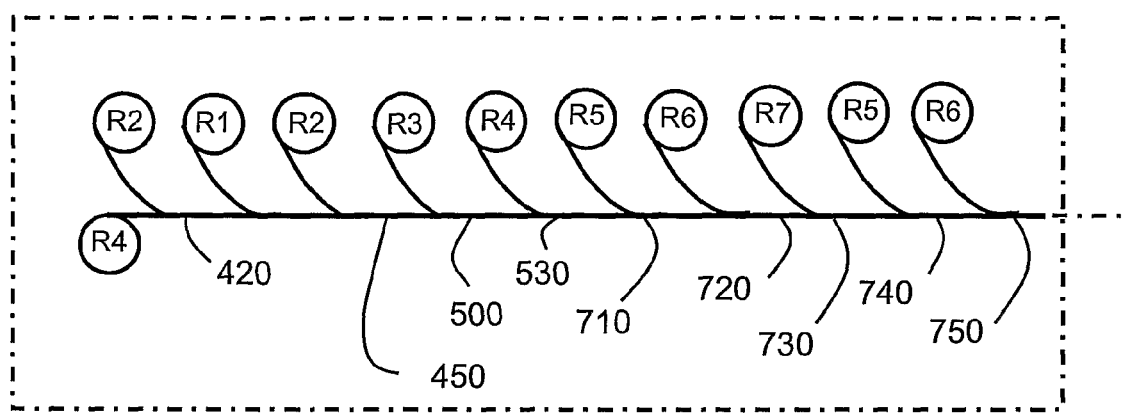

As elucidated in the forgoing, on account of the membrane 190 being a relatively fragile component, the roll R7 is included towards an exit from the assembly zone 310 in FIGS. 3a, 3b and 3c so that the membrane 190 is not subjected to risk of damage in preceding stages of the assembly zone 310. The membrane 190 is, in certain implementations of the fuel cell 110, a very significant contributor to a cost of fabricating the fuel cell 110 and hence considerable care is beneficially taken when handling it, either manually or automatically, in the assembly zone 310. Robotic handling of the membrane 190 is a substantially continuous manner is beneficial to employ in the apparatus 300.

In FIG. 3a, sheet materials from the rolls R1 to R7 are progressively joined together building up substantially symmetrically from the packing plate, for example the packing material plate 132, derived from the material provided from the roll R1; on account of the packing plate being mechanically stiff, mechanically robust and dimensionally stable fuel cells are provided from the assembly zone 310 to the testing station 320.

The apparatus 300 is distinguished from earlier known approaches to fuel cell manufacture in that plates, nets and meshes constituting components of fuel cells are supplied on a substantially continuous or completely continuous basis from rolls; in contradistinction, contemporary approaches to fuel cell manufacture involve individually stamping out component parts, for example plates, nets and packing, and then mutually individually assembling the component parts together in a substantially non-continuous manner.

Figure 4A:
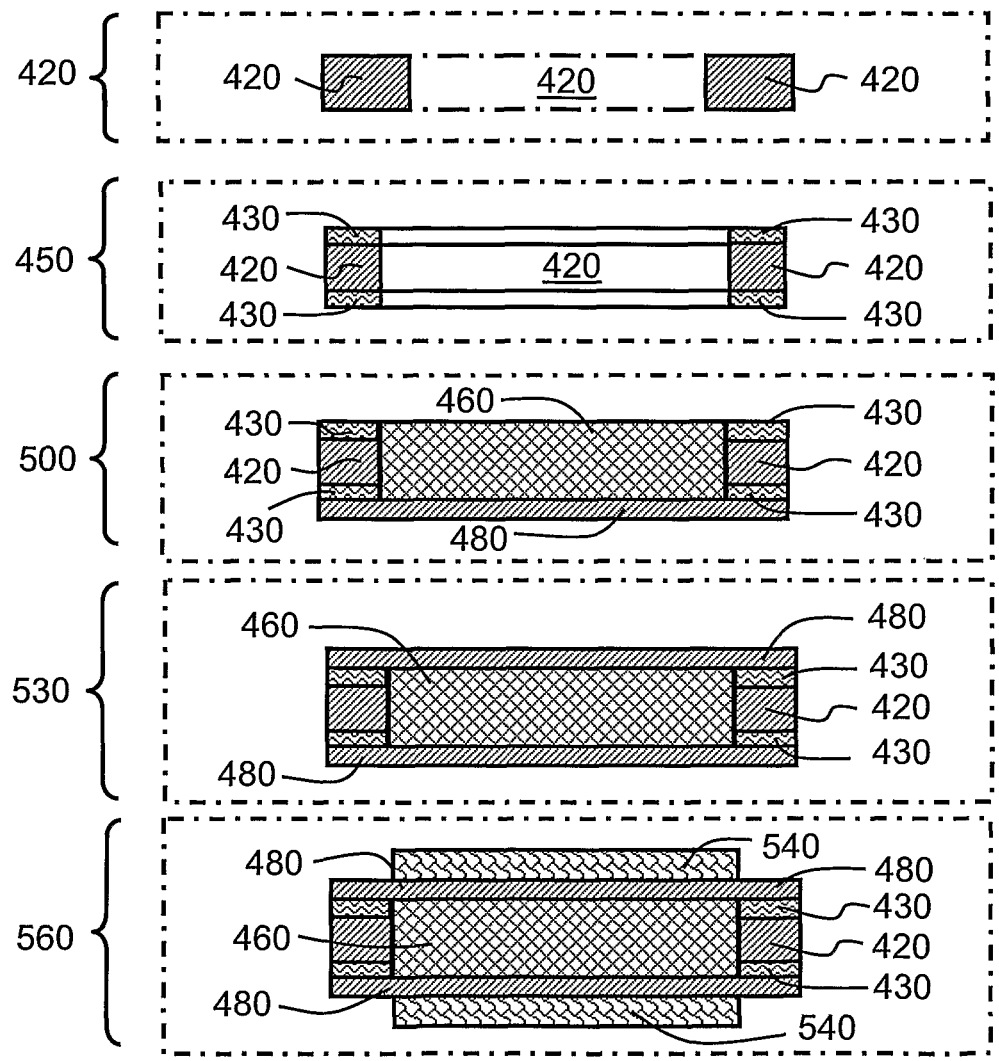
FIG. 4a is a schematic cross-sectional view of material layers included in strips continuously conveyed through the apparatus of FIG. 3a when in operation.
Figure 4A:
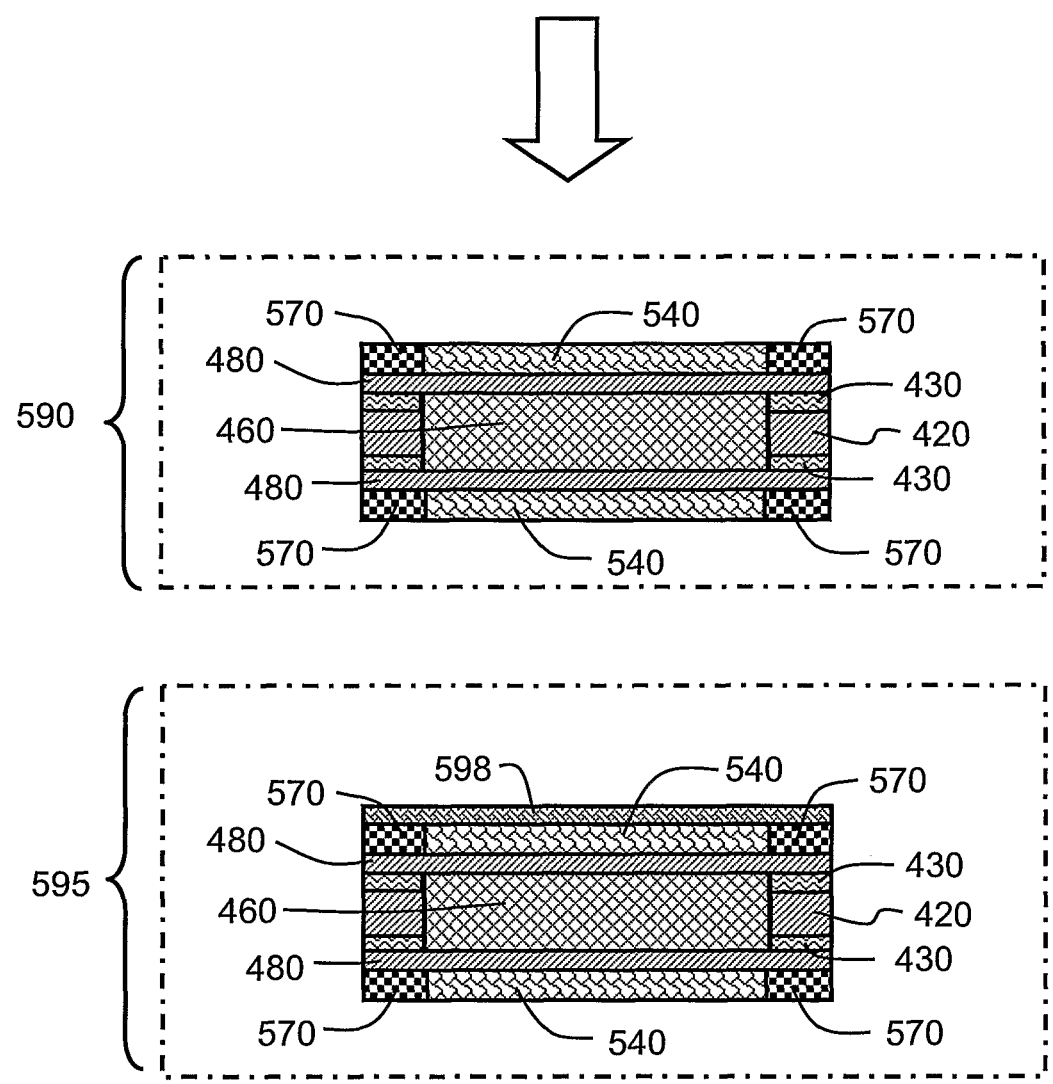

Referring also to FIG. 4a in addition to FIG. 3a, the apparatus 300 is operable to commence at the roll R1 with preparation of packing plates by continuously supplying metal roll sheet strip 400 through a pair of rollers 410 to suitably form the sheet strip 400 into formed metal sheet strip 420; such forming optionally, for example, includes punching or cutting holes to define a series of packing plates for fuel cells, wherein the central plates are mutually coupled via severable lugs as elucidated in the foregoing. The metal sheet strip 420 thereby comprises the aforementioned structural packing material plate 132 of the fuel cell 110 described earlier.

Gasket material 430 provided continuously from the rolls R2 is then bonded by way of rollers 440 onto the formed metal sheet strip 420 to form a first multilayer strip 450. Optionally, the gasket material 430 can be pre-formed or cut when dispensed from the rolls R2 to include channels for guiding fluids flow and central cutout regions therein. Optionally, the gasket material 430 can be molded or otherwise formed on a continuous basis prior to being subject to action of the rollers 440. The gasket material 430 is thereby manipulated to provide the aforesaid gasket seals 130, 135.

Figure 2A:
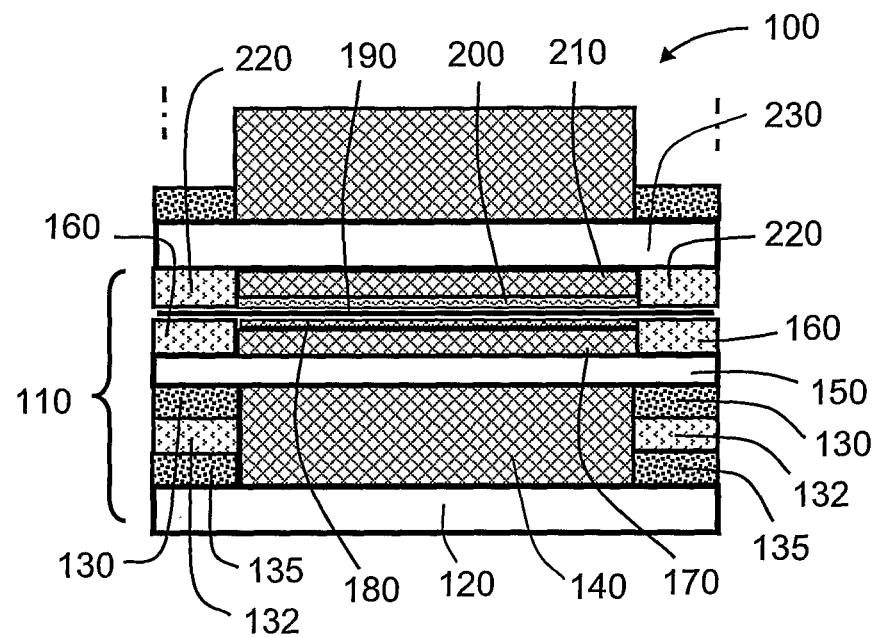
FIG. 2a is a cross-sectional diagram of a fuel cell manufactured according to a method of the present invention.

Thereafter, cooling net material 460, for example fabricated from a stainless steel or aluminum and suitable formed to size, is continuously added from the roll R3 to the first multilayer strip 450 via a roller 470, for example to form the aforesaid cooling mesh 140 as illustrated in FIG. 2a; substantially simultaneously plate or structural material 480 is continuously added from the first roll R4 via a roller 490 to a downwardly-facing surface of the first multilayer strip 450, for example to form the aforesaid first structural plate 120 as illustrated in FIG. 2a. By the action of the rollers 470, 490 continuously adding the cooling net 460 and the plate or structural material 480, the first multiplayer strip 450 is formed into a second multiplayer strip denoted by 500 in FIG. 3a. Next, metallic sheet material 510 is provided continuously from the second roll R4 and is added via a roller 520 to an upwardly-facing surface of the second multilayer strip 500 to form a third multilayer strip 530; an aforementioned cooling cell of the fuel cell 110 is thereby created.

Gas net material 540 is then provided from the rolls R5 and continuously added to upwardly-facing and downwardly-faces surfaces of the third multilayer strip 530 via rollers 550 to continuously form a fourth multilayer strip 560; the aforesaid first and second gas nets 170, 210 respectively are thereby provided.

Thereafter, cell gasket material 570 is continuously provided from the rolls R6 to upwardly-facing and downwardly-facing surfaces of the fourth multilayer strip 560 via rollers 580 to continuously generate a fifth multilayer strip 590; the aforesaid gasket seals 160, 220 as illustrated in FIG. 2a are thereby included.

Additionally, the aforementioned membrane 190 together with its associated first and second meshes 180, 200 are added from the roll R7 via a roller 593 to the fifth multilayer strip 590 to generate a sixth multilayer strip 595 including the membrane 190 as denoted by 598 in FIG. 4a. On account of such a membrane 190 being relatively thin, for example in a range of circa 10 to circa 100 m thick, it is relatively fragile and therefore not introduced earlier than necessary to ensure enhanced fuel cell yield during manufacture.

The sixth multilayer strip 595 effectively includes a series of automatically- and continuously-assembled fuel cells which pass to the testing station 320 as illustrated.

In FIG. 3a, materials continuously provided from the rolls R1 to R7 are illustrated as being directly supplied to form the strips 400, 420, 450, 500, 530, 560, 590, 595 as appropriate. In practice, various processing zones (not shown in FIGS. 3a and 3b), also conveniently referred as preparatory stages, are included between the rolls R1 to R7 and the strips 400, 420, 450, 500, 530, 560, 590, 595. These processing zones are operable to perform various functions such as one or more of: adding bonding agent, delineating gasket seals, punching holes, cutting holes using mechanical cutting knife edges, laser cutting holes, severing connection lugs to release individual pre-prepared parts for assembled cells 600. Optionally, the processing zones can include testing functions to ensure that the various functions have been performed correctly and thereby circumvent defective parts being assembled into fuel cells. Moreover, associated with the testing functions is optionally on-line repair functions, for example for repairing seals by selectively adding additional sealing material, by selectively adding polymer material to block pin-holes, by removing material in regions where there are detected unwanted electrical short-circuits and so forth.

Optionally, the processing zones include one or more preparatory stages including one or more of:

(i) a preparatory stage for bonding or molding gaskets or seals to one or more of layers of material and/or pre-formed component parts;

(ii) a preparatory stage for mechanically working one or more of the layers of material and/or component parts to shape them and/or to flatten them;

(iii) a preparatory stage for cutting one or more apertures or holes in one or more of the layers of material and/or component parts;

(iv) a preparatory stage for treating cut edges of one or more of the layers and/or component parts to passivate them from corrosion or chemical reaction with one or more of the reactants;

(v) a preparatory stage for adding coatings to one or more of the layers and/or component parts to activate and/or passivate them;

(vi) a preparatory stage for cutting or otherwise releasing one or more of the layers and/or components to release them from their respective rolls;

(vii) a preparatory stage for grinding and/or polishing surfaces of one or more of the layers of material and/or pre-formed component parts;

(viii) a preparatory stage for electro-polishing one or more of the layers of material and/or pre-formed component parts for enhancing their corrosion protection and/or for providing them with a smooth surface operable to exhibit lower electrical contact resistance;

(ix) a preparatory stage for cleaning one or more of the layers of material and/or pre-formed component parts for removing contamination therefrom; and (x) a preparatory stage for applying a welding operation to one or more of the layers of material and/or pre-formed component parts.

Optionally, the welding operation involves laser welding for welding various steel plates together for reducing a need for gaskets, for example nitrile and/or silicone sealing gaskets. Such laser welding is susceptible to forming reactant flow field configurations within fuel cells for enhancing their electrical power output capability and/or providing reduced flow resistance for reactants therethrough.

In FIG. 4a, various layers included in fuel cells included within the strips 420, 450, 500, 530, 560, 590, 595 are continuously conveyed through the assembly zone 310. The various layers are bonded together by action of the rollers 410, 440, 470, 490, 520, 550, 580, 593. As will be elucidated later, many of the various layers include spatial features, for example holes, molded gaskets and seals, stamped-out regions for providing channels through which reactants can flow in operation. The gaskets and seals are operable to provide a reliable seal to prevent reactants leaking out of the stacks 350 when in operation, for example in vehicles and portable power supplies.

The testing station 320 is operable to test fuel cells included in the sixth multilayer strip 595 prior to them being assembled to form stacks of fuel cells 350. Of special importance is that the cooling mesh or net 140, 460, the gas net material 170, 210, 540, and any other net layer included within the fuel cells are correctly positioned and stressed so as to be dimensionally stable in operation, for example when operating at an elevated temperature and/or when subjected to pressure differentials when in operation. Each fuel cell of the stacks 350 is operable to function at a nominal working temperature below circa 100.degree. C., although certain designs of the fuel cells are configured to operate at temperatures in a range of circa −40.degree. C. to circa 200.degree. C. However, it is envisaged that the stacks of fuel cells 350 are also influenced by pressure gradients existing therein during operation. Thus, the testing station 320 performs one or more of the following tests to establish fuel cell quality and integrity:

(a) a pressure test using a tracer gas for leak detection is implemented; a pressurizing device is coupled to inlet and output ports formed in the fuel cells to apply an excess pressure within the fuel cell during testing, such excess pressure including application of a tracer gas such as helium; a gas probe is moved around an external periphery of the fuel cell in an automated manner to check for local leakage of any tracer gas, for example helium; leaks in gasket and molded seals in the various layers are thereby identified;

(b) a weight test is performed wherein the fuel cell is weighed to ensure that a correct amount of material has been used to fabricate the fuel cell, for example that molded seals have been correctly formed and that excess molded gasket material has not excessively penetrated onto various nets and netting material employed to fabricate the fuel cell;

(c) one or more thickness measurements are implemented to ensure that the fuel cell is correctly assembled together, for example that strip, nets and netting material supplied form the rollers R1 to R7 are not distorted or buckled which could be detrimental to fuel cell performance;

(d) silhouette testing is performed to ensure that various layers forming the fuel cells have been correctly mutually aligned; such silhouette testing is beneficially performed using (Rontgen) X-rays, for example soft X-rays, in a direction substantially perpendicular to a plane of the various layers and/or laser radiation around a peripheral of the fuel cells; such silhouette testing is also capable of providing a thickness measurement when implemented parallel to major planes of the fuel cells; and (e) electrical resistance testing between electrical connection terminals of the fuel cells to check for any internal short circuits or open circuits which could adversely affect fuel cell performance when assembled into a stack 350. Preferably, the testing station 320 is operable to test fuel cell operation by one or more of:

(f) testing the fuel cells by applying thereto a fluid under excess pressure to pressure test the fuel cells and identify any occurrence of leaks therein;

(g) testing the fuel cells by weighing them to determine whether or not their weight is within a given range, or above and/or below a given threshold weight;

(h) testing the fuel cells by measuring one or more physical dimensions thereof to determine whether or not the fuel cells have each been correctly assembled together;

(i) testing the fuel cells by optically interrogating the fuel cells to ensure that their layers and/or component parts have been correctly mutually aligned;

(j) testing the fuel cells by performing one or more electrical measurements thereon to determine open circuit faults, short circuit faults and/or cell resistance faults;

(k) testing the fuel cells by applying "sniffing" or chemical detection tests thereto for detecting trace quantities of undesirable substances remaining for filet cell manufacture;

(l) testing the fuel cells to test for leaks between electrode compartments included within the fuel cells, said testing including further steps of plugging outlets of electrodes of the electrode compartments, supplying reactants to the electrode compartments and monitoring output potentials generated by the fuel cells;

(m) leak testing the fuel cells applying sniffing gases and/or tracer gases under excess pressure, for example said gases being preferably 5% hydrogen in nitrogen, and detecting any leaks of said sniffing gases and/or trace gases from the fuel cells to their surroundings by using gas sensing apparatus;

(n) testing pressure drop occurring in fuel cell components, half fuel cells or complete fuel cells in response to flow of a liquid and/or gas therethrough; and (o) testing flow signatures of fuel cell components, half fuel cells or completed fuel cells in response to a flow of a liquid and/or gas therethrough. In steps (k) and (m), sniffing gases such as helium, or a mixture of hydrogen diluted in nitrogen can be beneficially employed; preferably, a mixture of substantially 5% hydrogen diluted in nitrogen is employed. In the preparatory stages, each fuel cell is beneficially tested to identify leaks between anode and cathode electrodes, for example in a membrane fabricated into the fuel cells and/or in a reactant flow distribution arrangement fabricated into the fuel cells; such testing is optionally performed by applying a relatively small and variable first excess pressure by way of a first gas into a first electrode reactant chamber of each fuel cell, and relatively small and variable second excess pressure by way of a second gas into a second electrode reactant chamber of each fuel cell, and then detecting occurrence of mixing due to one or more leaks of the first and second gases. Beneficially, the first and second gases are hydrogen and nitrogen respectively. Moreover, the first and second excess pressures are optionally mutually dissimilar.

In the testing station 320, fuel cells 110 which are found to be defective are beneficially mutually separated from fuel cells 110 which are found to be intact and functional. As elucidated earlier, associated with the testing station 320 is optionally a repair station wherein non-functional fuel cells 110 are dismantled, for example by robotic handling processes, and then return to the apparatus 300 for reassembly as part of a continuous assembly processes occurring in operation in the apparatus 300. Dismantling of fuel cells 600 is achieved by one or more of: mechanical separation of layers of the fuel cell 600, pressurizing the fuel cell 600 with compressed gas to cause its layers to separate, adding release chemicals to cause various seals present in the fuel cell 600 to mutually separate them. Components such as gas meshes, structural plates, and proton exchange membranes with catalyst are potentially most valuable to recover and reuse. Thereby reducing waste during manufacture.

As elucidated earlier, certain functions of the testing station 320 can optionally be implemented earlier within the apparatus 300, for example for pre-testing parts, or for testing the fuel cells 110 earlier during manufacture at a stage whereat other layers to be added later do not obscure view. For example, inspection using cameras and optical imaging for checking alignment of cooling nets and gasket seals is preferably executed earlier in the apparatus rather than at the testing station 320 as illustrated in FIG. 3. Moreover, beneficially, certain testing functions are also executed after the separation station 330, for example testing of completed stacks 350 for leaks and electrical integrity.

Figure 5:
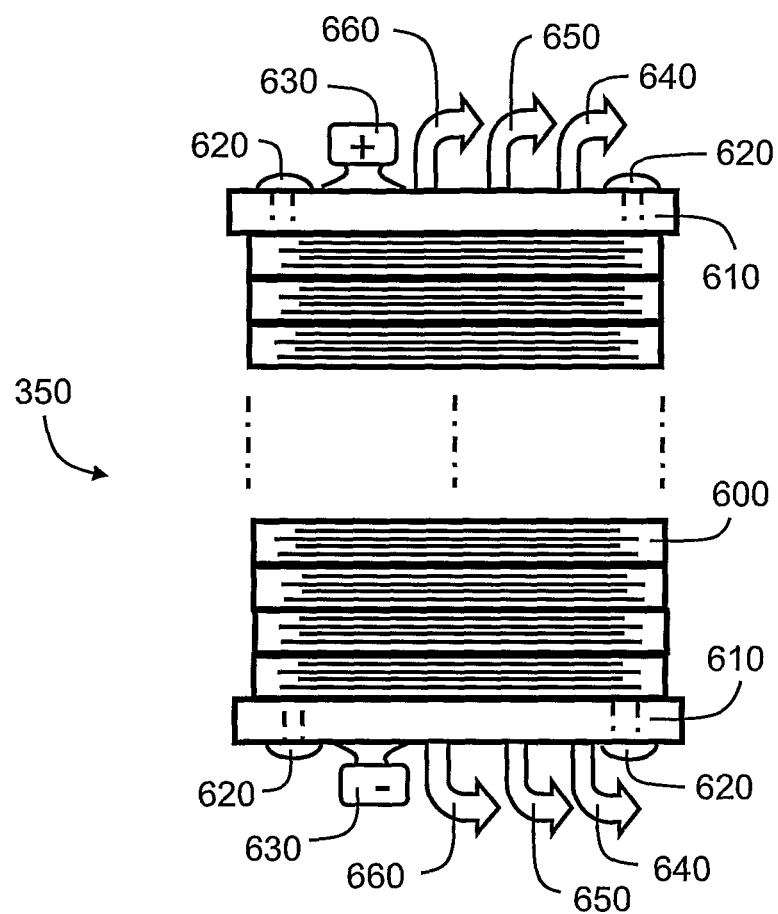
FIG. 5 is a schematic cross-section view of an assembled stack of fuel cells forming a fuel cell pack.

In the separation station 330, the assembled fuel cells are mutually separated by a cutting operation or similar process. Fuel cells which are marked as being defective by earlier testing at the testing station 320 are beneficially removed at the separation station 330, for example by using a magnetic gripper or alternative removal mechanism. The separated intact fuel cells 110 are then passed to the stacking station 340 whereat the fuel cells 110 are automatically and continuously assembled to form the stacks of fuel cells 350 as depicted in FIG. 5 wherein individual fuel cells are denoted by 600. Optionally, the assembled stacks 350 are subject to further final checks and testing to ensure that no defects are introduced during stacking and when implementing electrical connections and reactant channels connections between the fuel cells; for example, it is desirable to check that the membrane 190 is intact without puncture holes, and that the sealing gaskets 130, 135, 160, 220 are impervious to fluid or liquid ingression therethrough. As shown in FIG. 5, the stacks of fuel cells 350 are provided with end plates 610 at end regions of the stacks 350 and include elongate bolts 620 or similar types of fasteners added to hind each stack 350 together; alternatively, the fuel cells 600 are stacked into containers, for example plastics material molded containers, to which one or more end plates are added; more preferably, such containers have resilient snap-fit retention of fuel cells to circumvent a need to employ bolts to bind a stack of fuel cells 600 together. Optionally, the one or more end plates are spring-clip or similarly resiliently engaged into such plastics material molded containers for avoiding a need to utilize screws during fuel stack assembly, thereby reducing production time and number of components parts needing to be mutually assembled.

Such end plates 610 beneficially include electrical connections 630 for extracting electrical power from the stack 350 when in operation, and also fluid and/or gas coupling connections 640, 650, 660 for coupling flows of reactants and coolant to the stack 350 and for removing reaction byproducts and coolant from the stack 350. Optionally, the elongate bolts 620 are included at corners of the end plates 610 and corresponding holes are formed in the various layers of the fuel cells 600 for accommodating the bolts 620; a central region of each fuel cell 600 is thereby available for providing a reaction region for the reactants provided to the fuel cells 600 forming the stack 350.

On account of the apparatus 300 functioning in a continuous manner, fuel cells 600 and associated stacks 350 of such fuel cells 600 are susceptible to being of reproducible and consistent manufacturing quality, thereby ensuring high product quality. Moreover, the testing station 320 provides a further check that high quality and reliable performance are provided by the fuel cells 600. Moreover, optional testing and associated repair occurring within the apparatus 300 and/or at the testing station 320 is beneficial in reducing quantities of waste generated during fabrication of the fuel cells 600.

The separation station 330 preferably includes rotating cutting wheels or reciprocating cutting knife edges. These cutting wheels and cutting knife edges are arranged so as not to stress the fuel cells 600 when being separated to avoid distorting nets and meshes incorporated into the fuel cells 600. In the apparatus 300, material provided from the rolls R1 to R7 are optionally pre-patterned, for example by punching or cutting operations, before being added to the strips 420, 450, 500, 530, 560, 590, 595 as appropriate. Moreover, sealing gasket and spacer layers are optionally molded in a stepwise continuous manner onto material being provided from the rolls R1 to R7; for example, silicone sealing material can be molded onto nets and netting material provided from the rolls R3, R5 prior to being bonded onto the strips 450, 530 by way of the rollers 470, 550. Seals employed within the fuel cells 600 optionally have a thickness less than circa 1 mm, for example in a range of circa 0.1 to circa 0.8 mm.

In the assembly zone 310, regions between the rolls R1 to R7 and the strips 420, 450, 500, 530, 560, 590, 595 include various forms of surface treatment applied to material extracted from one or more of the rolls R1 to R7. Such treatments can include surface treatments to chemically activate surfaces and/or to resist corrosion in operation and/or to passivate surfaces. Holes and perforations cut into the material are optionally performed at a speed susceptible to circumventing changing of metal grain sizes which could give rise to sites whereat enhanced corrosion can occur. Cuts in the material are preferably made at a shallow angle relative to a perpendicular to a plane of the material using relatively large diameter cutting tools or linearly reciprocating tools. Where possible, exposed edges whereat cutting has been implemented, for example holes cut into the aforesaid net or netting material, are preferably locally chemically treated, protected and/or otherwise passivated so as to reduce occurrence of corrosion.

The fuel cell 600 is optionally built up substantially symmetrically about the sheet strip 400 which is configured to be a packing material plate, for example the packing material plate 132 as illustrated in FIG. 2a; alternatively, the fuel cell 600 is optionally built up about one or more of the structural plates 120, 150. Subsequent fabrication steps are arranged to construct the aforesaid cooling cell or chamber. Such form of construction is of benefit in reducing mechanical stresses arising in each fuel cell 600, and hence in corresponding stacks of fuel cells 350, thereby enhancing operating reliability.

Figure 2B:
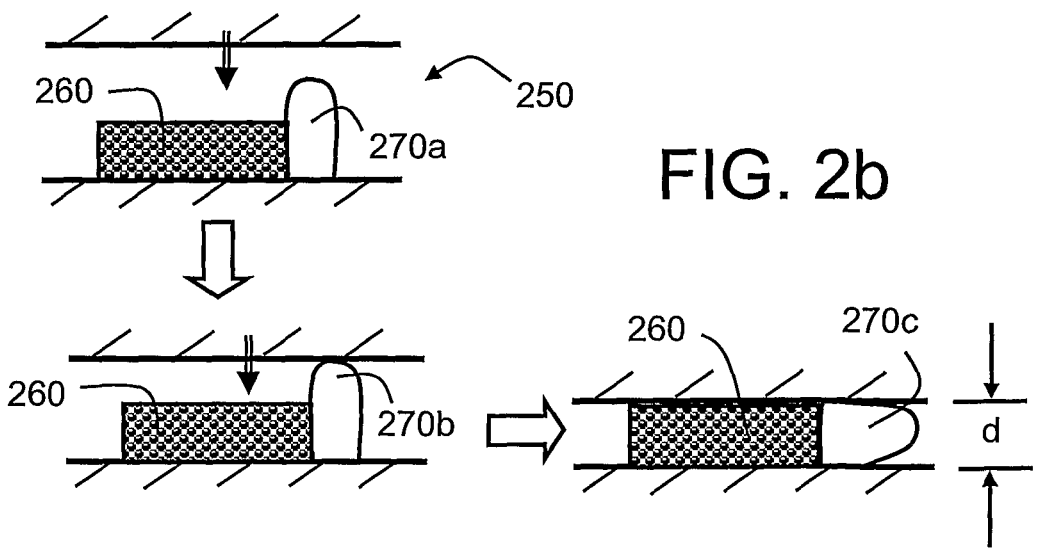

Although various layers forming the fuel cell 600 are depicted in sixth multilayer strip 595 as illustrated in FIG. 3a, it will be appreciated that the layers forming the fuel cell 600 are patterned or otherwise formed to provide two reactant chambers, one electrolyte region and one cooling chamber. The two reactant chambers are included at two sides of the electrolyte region. The cooling chamber is either located at an anode side or cathode side or at both sides of the electrolyte. However, from a mechanical viewpoint, the cooling chamber is beneficially, for example, substantially central to the fuel cell 600. One or more of the rolls R1 to R7 optionally comprise pre-prepared component parts of the fuel cell 600; for example, one or more of the rolls R1 and R7 can comprise at least one of:

(a) pre-prepared component parts held on a bearer; and
(b) pre-prepared component parts Which are held together by vestigial connections which are then severed as the component parts are added to their respective strip in the assembly zone 310. Optionally, net components employed in fabricating the fuel cell 600 are pre-filled with sealing material with exception of their active area operable to be exposed to reactant, for example gases such as methane, propane, hydrogen, air or oxygen; such a manner of manufacture is susceptible to providing seals as depicted in FIG. 2b wherein an increasing compressive force initially deforms a more elastic component, for example injected silicon or overlaid and/or bonded silicone or similar sheet, to provide a fluid and/or liquid seal, such that the deformation resulting from the compressive force is eventually dimensionally resisted by more rigid net material. The sealing material is optionally injected or sprayed into such nets and netting material components. Optionally, seals and gaskets are implemented using hot-melted adhesive, molding, spraying or similar; for example, such seals and gaskets can be prepared on a surface of a roller and then transferred therefrom to layers forming the fuel cells 600; such seals are beneficially implemented in a manner shown in FIG. 2b.

Referring next to general construction of the fuel cell 600, the cell 600 is optionally, for example, fabricated to have a form generally similar manner to a fuel cell described in a published PCT application no. WO 2004/027910 wherein various layers are stacked together to form a fuel cell having holes, channels and chambers formed or cut thereinto to form a labyrinth of fluid channels, chambers and cavities.

Optionally, in the assembly zone 310, robotic handling of certain component parts such as net components is optionally employed in combination with an essentially continuous production process. For example, the membrane 190 is a potentially fragile component, although such fragility is dependent upon its manner of manufacture; it is optionally beneficial that the membrane 190 is assembled into position in a delicate manner, for example with optical feedback to ensure accurate positioning and overlay, using robotic or similar handling. Optionally, such robotic handling can be implemented in an effectively continuous operation.

In FIG. 3a, the apparatus 300 is illustrated as including the assembly zone 310 preceding the testing station 320. it will be appreciated that such zones and stations can be at least partially merged such that at least a part of the testing station 320 is implemented within the assembly zone 310. For example, testing is beneficially performed on the fifth multilayer strip 590 to check for defective fuel cell manufacture before attempting to add the membrane 190 and its associated meshes and electrodes which is often a costly component relative to a cost of other components employed in fabricating the fuel cell 110; in an event, of a defective fuel cell being identified in the strip 590, the apparatus 300 is beneficially operable to refrain from applying the membrane 190 thereto and the defective fuel cell is permitted to propagate to the separation station 330; the defective fuel cell is either rejected at the separation station 330 or beneficially repaired for subsequent reintroduction into the assembly zone 310.

Figure 4B:
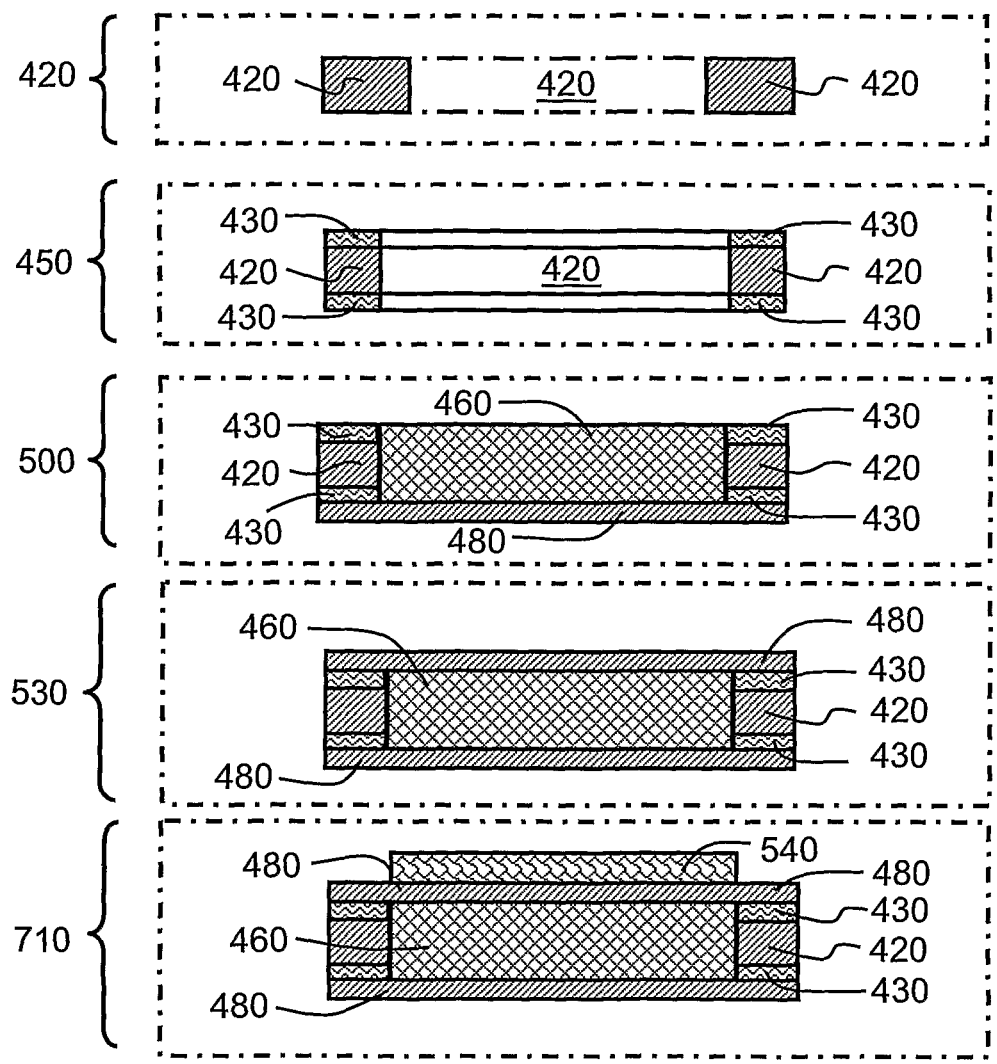
FIG. 4b is a schematic cross-sectional view of material layers included in strips continuously conveyed through the apparatus of FIG. 3b when in operation.
Figure 4B:
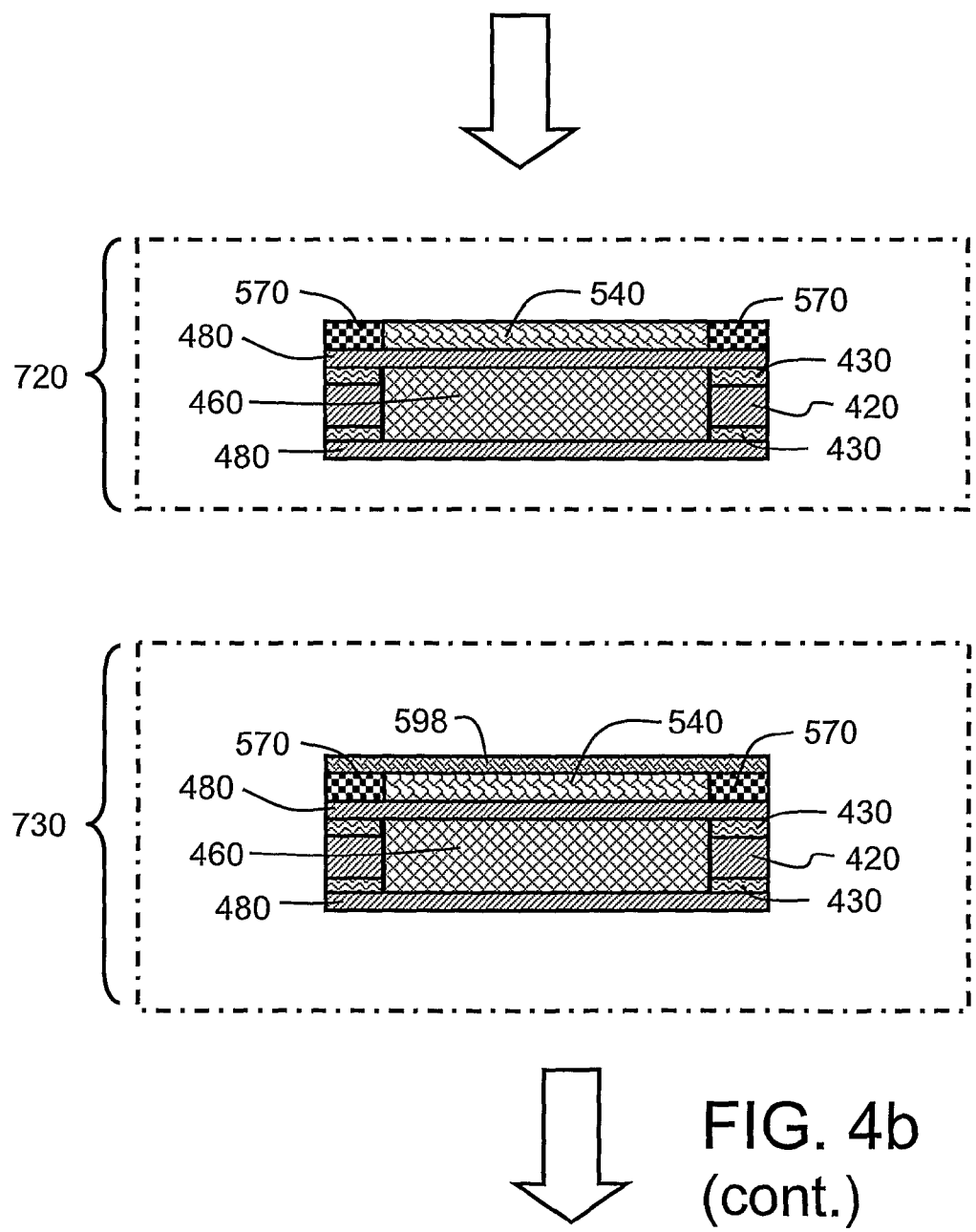
Figure 4B:
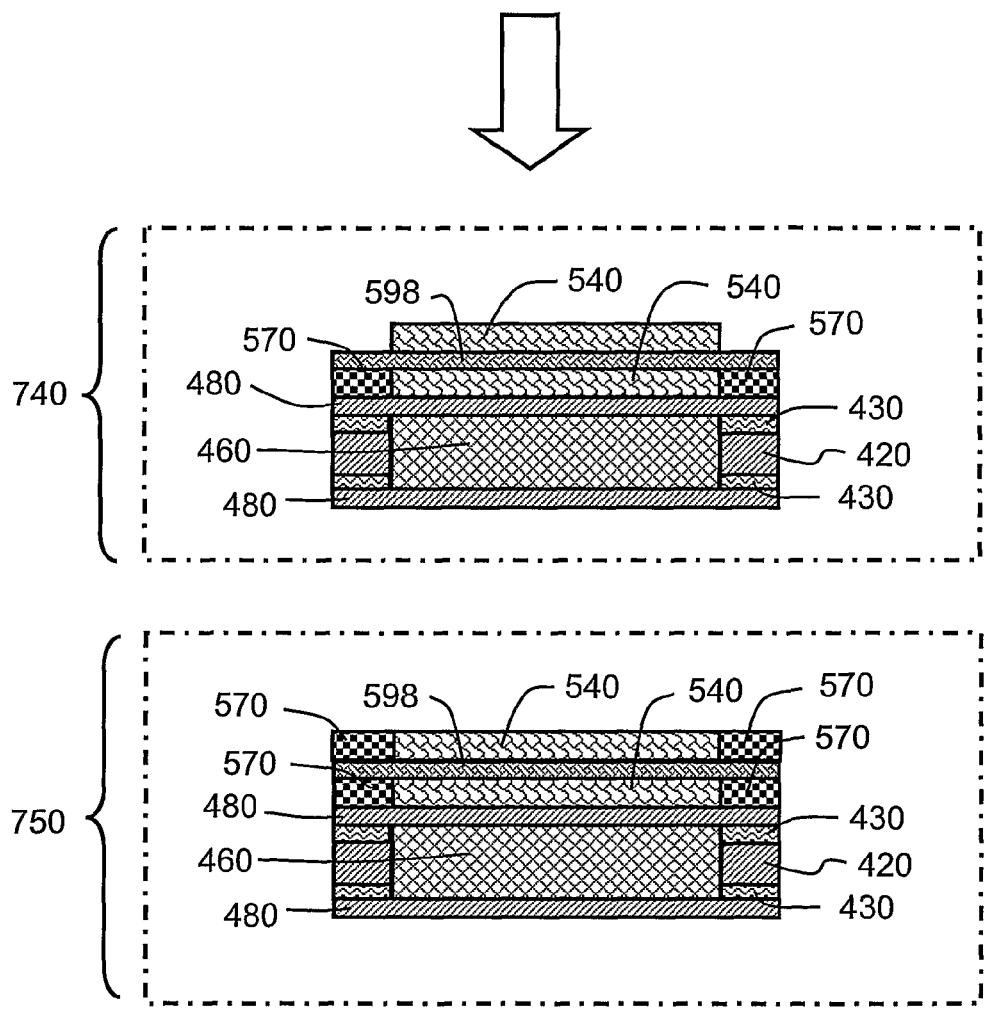

Although a method of fabricating the fuel cell 110 is described in the foregoing with reference the FIGS. 2a, 3a, 4a, it will be appreciated that the assembly zone 310 is optionally implemented in alternative configurations, For example, the rolls R1 to R7 of the assembly zone 310 are susceptible to being disposed as illustrated in outline in FIG. 3b; various rollers associated with the rolls R1 to R7 are not shown for simplicity. By employing an assembly zone 310 as shown in FIG. 3b, the fuel cell 110 is assembled in a sequence as illustrated in FIG. 4b wherein third multilayer strip 530 comprising the cooling chamber denoted by 420, 430, 460, 480— denoted by 120, 135, 132, 150, 160, 140 in FIG. 2a—is followed by;

(a) a strip 710 to which the gas net material 540, denoted by 170 in FIG. 2a, has been added from a first roll R5;
(b) a strip 720 to which the cell gasket material 570, denoted by 160 in FIG. 2a, has been added from the roll R6;
(c) a strip 730 to which an assembly including meshes, electrodes and an ion-transfer membrane akin to the membrane 190 and the meshes 180, 200 in FIG. 2a has been added from the roll R7;
(d) a strip 740 to which the gas net material 540, denoted by 210 in FIG. 2a, has been added from a second roll R5; and
(e) a strip 750 to which the cell gasket material 570, denoted by 220 in FIG. 2a, has been added from the roll R6.

The fuel cell 110 included in the strip 750 is distinguished in that it is not built up symmetrically about the cooling cell as depicted in FIG. 4a. Whereas in FIG. 4b stresses are not balanced as in a manner depicted in FIG. 4a, FIG. 4b illustrates fabrication of the fuel cell 110 so that the fuel cell 110 is easily capped with a temporary top plate in the testing station 320 for operative fuel cell testing and quality control purposes. Moreover, the fuel cell 110 as fabricated pursuant to FIG. 4b is of benefit in that it can be handled from its robust plate or structural material 480, whereas the fuel cell 110 as fabricated pursuant to FIG. 4a has its membrane assembly exposed to potential damage until assembled into the stack 350. The fuel cell 110 is susceptible, for example, to being fabricated in the apparatus as illustrated in FIG. 3c based upon a structural plate with its associated membrane being added relatively late in the apparatus.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

Numerals included within parentheses in the accompanying claims are intended to assist understanding of the claims and should not be construed in any way to limit subject matter claimed by these claims.

For completeness, a general summary will now be provided of the foregoing.

There is described in the forgoing a first general method of substantially continuously manufacturing fuel cells 110, 600 operable to generate electrical power from reactions of one or more reactants therein, wherein, each fuel cell 110, 600 comprises a plurality of component parts 420, 430, 460, 480, 540, 570, 598 assembled and/or laminated together in a stacked configuration, the method including steps of:

(a) providing a plurality of rolls (R1, R2, R3, R4, R5, R6, R7) of material and/or pre-formed component parts for fabricating the fuel cells 110, 600;

(b) in a substantially continuous manner, progressively assembling and/or laminating layers of material and/or pre-formed component parts from the plurality of rolls (R1, R2, R3, R4, R5, R6, R7) to fabricate a series of the fuel cells 110, 600 or parts of the fuel cells;

(c) applying a testing procedure to the series of the fuel cells 110, 600 or parts of the fuel cells to identify one or more functional fuel cells 110, 600 or parts thereof; and (d) mutually separating the one or more functional fuel cells 110, 600 into individual fuel cells 110, 600, parts of the fuel cells or stacks 350 of such fuel cells for subsequent use.

Optionally, assembly in the first general method is commenced from a substantially central layer 132 (e.g., central layer 132, i.e., packing material plate), 420 (e.g., central layer 420, i.e., metal sheet strip) providing each fuel cell 110, 600 with structural rigidity. More optionally, in the first method, the central layer 132, 420 is a substantially rigid structural layer of each of said fuel cells 110, 600, or is a central chamber of each of said fuel cells 110, 600.

Optionally, step (b) of the first general method involves supplying layers of material and/or pre-formed component parts to one or more preparatory processes before and/or whilst being assembled and/or laminated to form the series of fuel cells 110, 600.

Optionally, in the first general method, the one or more preparatory processes include one or more of:

(e) bonding or molding gaskets or seals to one or more of the layers of material and/or pre-formed component parts;

(f) mechanically working one or more of the layers of material and/or component parts to shape them and/or to flatten them;

(g) cutting one or more apertures or holes in one or more of the layers of material and/or component parts;

(h) treating cut edges of one or more of the layers and/or component parts to passivate them from corrosion or chemical reaction with one or more of the reactants;

(i) adding coatings to one or more of the layers and/or component parts to activate and/or passivate them;

(j) cutting or otherwise releasing one or more of the layers and/or components to release them from their respective rolls;

(k) grinding and/or polishing surfaces of one or more of the layers of material and/or pre-formed component parts;

(l) electro-polishing one or more of the layers of material and/or pre-formed component parts for enhancing their corrosion protection and/or for providing them with a smooth surface operable to exhibit lower electrical contact resistance;

(m) cleaning one or more of the layers of material and/or pre-formed component parts for removing contamination therefrom; and (n) applying a welding operation to one or more of the layers of material and/or pre-formed component parts.

In the first general method, step (c) includes at least one testing operation including one or more of:

(o) testing the fuel cells 110, 600 by applying thereto a fluid under excess pressure to pressure test the fuel cells 110, 600 and identify any occurrence of leaks therein;

(p) testing the fuel cells 110, 600 by weighing them to determine whether or not their weight is within a given range, or above and/or below a given threshold weight;

(q) testing the fuel cells 110, 600 by measuring one or more physical dimensions thereof to determine whether or not the fuel cells 110, 600 have each been correctly assembled together;

(r) testing the fuel cells 110, 600 by optically interrogating the fuel cells 110, 600 to ensure that their layers and/or component parts have been correctly mutually aligned;

(s) testing the fuel cells 110, 600 by performing one or more electrical measurements thereon to determine open circuit faults, short circuit faults and/or cell resistance faults;

(t) testing the fuel cells 110, 600 by applying "sniffing" or chemical detection tests thereto for detecting trace quantities of undesirable substances remaining from fuel cell manufacturing processes;

(u) testing the fuel cells 110, 600 to test for leaks between electrode compartments included within the fuel cells 110, 600, the testing including further steps of plugging outlets of electrodes of the electrode compartments, supplying reactants to the electrode compartments and monitoring output potentials generated by the fuel cells;

(v) leak testing the fuel cells by applying sniffing gases and/or tracer gases under excess pressure, for example the gases being preferably 5% hydrogen in nitrogen, and detecting any leaks of the sniffing gases and/or trace gases from the fuel cells to their surroundings by using gas sensing apparatus;

(w) testing pressure drop occurring in fuel cell components, half fuel cells or complete fuel cells in response to flow of a liquid and/or gas therethrough; and (x) testing flow signatures of fuel cell components, half fuel cells or completed fuel cells in response to a flow of a liquid and/or gas therethrough.

More optionally, in the first general method, step (a) or step (v) includes steps of:

(y) applying a tracer gas under excess pressure to each fuel cell 110, 600; and (z) spatially sampling using one or more tracer gas probes around an external periphery of each fuel cell 110, 600 to check for local leakage of the tracer gas therefrom.

More optionally, in the first general method, step (r) includes one or more steps of:

(aa) optically interrogating the fuel cells 110, 600 using one or more optical radiation beams around a peripheral region of each fuel cell 110, 600 and/or whereat aperture and/or holes are formed into the fuel cells 110, 600; and (bb) executing imaging of layers and/or component parts included in each fuel cell 110, 600 using (Rontgen) X-rays to detect faults or defects arising therein during fabrication.

Optionally, the first general method includes a step of mutually synchronizing delivery of material and/or components parts from the plurality of rolls (R1, R2, R3, R4, R5, R6, R7) for ensuring mutually accurate alignment thereof in the fuel cells 110, 600.

Optionally, the first general method includes steps of forming holes, channels and chambers in the material and/or components parts so as to provide the fuel cells 110, 600 with one or more paths through which the one or more reactants are operable to flow when the fuel cells 110, 600 are in operation.

Optionally, the first general method includes steps of forming said holes, channels and chambers are such so as to enable said fuel cells 110, 600 to be assembled into corresponding stacks of fuel cells 350, each stack 350 being susceptible to being terminated by one or more end plates 610 at which electrical connections 630 and fluid and % or gas connections 640, 650, 660 are provided.

A second general method of substantially continuously manufacturing fuel cells 110, 600 operable to generate electrical power from reactions of one or more reactants therein, wherein each fuel cell 110, 600 comprises a plurality of component parts 420, 430, 460, 480, 540, 570, 598 assembled and/or laminated together in a stacked configuration, the method including steps of:

(a) providing a plurality of rolls (R1, R2. R3, R4, R5, R6, R7) of material and/or pre-formed component parts for fabricating the fuel cells 110, 600 or parts thereof;

(b) in a substantially continuous manner, progressively assembling and/or laminating layers of material and/or preformed component parts from the plurality of rolls (R1, R2, R3, R4, R5, R6, R7) to manufacture a series of the fuel cells 110, 600 or parts thereof; and (c) mutually separating the one or more functional fuel cells 110, 600 into individual fuel cells 110, 600, parts thereof or stacks 350 of such fuel cells for subsequent use.

Optionally, in the second general method, step (b) assembly commences from a substantially central layer 132 (e.g., central layer 132, i.e., packing material plate), 420 (e.g., central layer 420, i.e., metal sheet strip) providing each fuel cell 110, 600 with structural rigidity, the central layer 132, 420 being a substantially rigid structural layer of each of the fuel cells 110, 600, or a central chamber of each of the fuel cells 110, 600.

There is earlier described an apparatus 300 operable to substantially continuously manufacture fuel cells 110, 600 operable to generate electrical power from reactions of one or more reactants therein, and wherein each fuel cell 110, 600 comprises a plurality of component parts 420, 430, 460, 480, 540, 570, 598 assembled and/or laminated together in a stacked configuration, the apparatus 300 including:

(a) a mounting arrangement for receiving a plurality of rolls (R1, R2, R3, R4, R5, R6, R7) of material and/or pre-formed component parts for fabricating the fuel cells 110, 600 or parts thereof;

(b) one or more assembly devices 410, 440, 470, 490, 520, 550, 580, 593 operable, in a substantially continuous manner, to progressively assemble and/or laminate layers of material and/or pre-formed component parts from the plurality of rolls (R1, R2, R3, R4, R5, R6, R7) to fabricate a series of the fuel cells 110, 600 or a series of parts of the fuel cells;

(c) a testing station 320 operable to apply a test procedure to the series of the fuel cells 110, 600 or parts thereof to identify one or more functional fuel cells 110, 600 or parts thereof; and (d) a separating station 330 operable to mutually separate the one or more functional fuel cells 110, 600 into individual fuel cells 110, 600, parts thereof or stacks 350 of such fuel cells 110, 600 for subsequent use.

Optionally, the apparatus 300 is operable to commence from a substantially central layer 132 (e.g., central layer 132, i.e., packing material plate), 420 (e.g., central layer 420, i.e., metal sheet strip) providing each fuel cell 110, 600 with structural rigidity.

Optionally, the first general apparatus is operable to manufacture the series of fuel cells 110, 600 so that the central layer 132 (e.g., central layer 132, i.e., packing material plate), 420 (e.g., central layer 420, i.e., metal sheet strip) is a substantially rigid structural layer of each of the fuel cells 110, 600, or is a central chamber of each of the fuel cells 110, 600.

More optionally, the apparatus 300 includes one or more preparatory stages operable to receive layers of material and/or pre-formed component parts from the rolls (R1, R2, R3, R4, R5, R6, R7) for preparatory processing prior to and/or whilst being assembled and/or laminated to form the series of fuel cells 110, 600.

More optionally, the first general apparatus is implemented such that the one or more preparatory stages include one or more of:

(e) a preparatory stage for bonding or molding gaskets or seals to one or more of the layers of material and/or pre-formed component parts;

(f) a preparatory stage for mechanically working one or more of the layers of material and/or component parts to shape them and/or to flatten them;

(g) a preparatory stage for cutting one or more apertures or holes in one or more of the layers of material and/or component parts;

(h) a preparatory stage for treating cut edges of one or more of the layers and/or component parts to passivate them from corrosion or chemical reaction with one or more of the reactants;

(i) a preparatory stage for adding coatings to one or more of the layers and/or component parts to activate and/or passivate them;

(j) a preparatory stage for cutting or otherwise releasing one or more of the layers and/or components to release them from their respective rolls (R1, R2, R3, R4, R5, R6, R7);

(k) a preparatory stage for grinding and/or polishing surfaces of one or more of the layers of material and/or pre-formed component parts;

(l) a preparatory stage for electro-polishing one or more of the layers of material and/or pre-formed component parts for enhancing their corrosion protection and/or for providing them with a smooth surface operable to exhibit lower electrical contact resistance;

(m) a preparatory stage for cleaning one or more of the layers of material and/or pre-formed component parts for removing contamination therefrom; and (n) a preparatory stage for applying a welding operation to one or more of the layers of material and/or pre-formed component parts.

Optionally, the first general apparatus is implemented such that the testing station 320 is operable to test fuel cell 110, 600 operation by one or more of:

(a) testing the fuel cells 110, 600 by applying thereto a fluid under excess pressure to pressure test the fuel cells 110, 600 and identify any occurrence of leaks therein;

(p) testing the fuel cells 110, 600 by weighing them to determine whether or not their weight is within a given range, or above and/or below a given threshold weight;

(q) testing the fuel cells 110, 600 by measuring one or more physical dimensions thereof to determine whether or not the fuel cells 110, 600 have each been correctly assembled together;

(r) testing the fuel cells 110, 600 by optically interrogating the fuel cells 110, 600 to ensure that their layers and/or component parts have been correctly mutually aligned;

(s) testing the fuel cells 110, 600 by performing one or more electrical measurements thereon to determine open circuit faults, short circuit faults and/or cell resistance faults;

(t) testing the fuel cells 110, 600 by applying "sniffing" or chemical detection tests thereto for detecting trace quantities of undesirable substances remaining from fuel cell manufacturing processes;

(u) testing the fuel cells 110, 600 to test for leaks between electrode compartments included within the fuel cells 110, 600, the testing including further steps of plugging outlets of electrodes of the electrode compartments, supplying reactants to the electrode compartments and monitoring output potentials generated by the fuel cells;

(v) leak testing the fuel cells applying sniffing gases and/or tracer gases under excess pressure, for example the gases being preferably 5% hydrogen in nitrogen, and detecting any leaks of the sniffing gases and/or trace gases from the fuel cells to their surroundings by using gas sensing apparatus;

(w) testing pressure drop occurring in fuel cell components, half fuel cells or complete fuel cells in response to flow of a liquid and/or gas therethrough; and (x) testing flow signatures of fuel cell components, half fuel cells or completed fuel cells in response to a flow of a liquid and/or gas therethrough.

More optionally, in the first general apparatus, the testing station 320 is operable to:

(y) apply a tracer gas under excess pressure to each fuel cell 110, 600; and (z) spatially sample using one or more tracer gas probes around an external periphery of the fuel cell 110, 600 to check for local leakage of the tracer gas therefrom.

More optionally, in the first general apparatus, the testing station 320 is operable to:

(aa) optically interrogate the fuel cells 110, 600 using one or more optical radiation beams around a peripheral region of each fuel cell 110, 600 and/or whereat aperture and/or holes are formed into the fuel cells 110, 600; and/or (bb) execute imaging of layers and/or component parts included in each fuel cells 110, 600 using (Rontgen) X-rays to detect fabrication faults arising therein during fabrication.

Optionally, the first general apparatus includes a synchronization arrangement for mutually synchronizing in operation delivery of material and/or components parts from the plurality of rolls (R1, R2, R3, R4, R5, R6, R7) for ensuring mutually accurate alignment thereof in the fuel cells 110, 600.

Optionally, the apparatus 300, includes tools which are operable to form holes, channels and chambers in the material and/or components parts so as to provide the fuel cells 110, 600 with one or more paths through which the one or more reactants are operable to flow when the fuel cells 110, 600 are in operation.

Optionally, in the apparatus 300, the tools for forming the holes, channels and chambers are disposed so as to enable the fuel cells 110, 600 to be assembled into corresponding stacks of fuel cells 350, each stack 350 being susceptible to being terminated by one or more end plates 610 at which electrical connections 630 and fluid connections 640 are provided.

There is described an apparatus 300 operable to substantially continuously manufacture fuel cells 110, 600 operable to generate electrical power from reactions of one or more reactants therein, and wherein each fuel cell 110, 600 comprises a plurality of component parts 420, 430, 460, 480, 540, 570, 598 assembled and/or laminated together in a stacked configuration, the apparatus 300 including:

(a) an assembly zone 310 comprising a mounting arrangement for receiving a plurality of rolls (R1, R2, R3, R4, R5, R6, R7) of material and/or pre-formed component parts for fabricating the fuel cells 110, 600 or parts thereof, and one or more assembly devices 410, 440, 470, 490, 520, 550, 580, 593 operable, in a substantially continuous manner, to progressively assemble and/or laminate layers of material and/or pre-formed component parts from the plurality of rolls (R1, R2, R3, R4, R5, R6, R7) to manufacture a series of the fuel cells 110, 600 or a series of parts therefore;

(b) a testing station 320 for applying a test procedure to the series of the fuel cells 110, 600 or parts thereof to identify one or more functional fuel cells 110, 600 thereof or parts thereof;

(c) a separation station 330 operable to mutually separate the one or more functional fuel cells 110, 600 into individual fuel cells 110, 600, parts thereof or stacks 350 of such fuel cells 110, 600; and (d) a stacking station 340 for mutually assembling the functional fuel cells 110, 600 or the groups 350 of such functional fuel cells 110, 600 into stacks 350 of such fuel cells 110, 600 to manufacture packs of such fuel cells 110, 600.

Optionally, in the first general apparatus, assembly in the assembly zone 310 is commenced from a substantially central layer 132 (e.g., central layer 132, i.e., packing material plate), 420 (e.g., central layer 420, i.e., metal sheet strip) providing each fuel cell 110, 600 with structural rigidity.

More optionally, the first general apparatus includes one or more preparatory stages operable to receive layers of material and/or pre-formed component parts from the rolls (R1, R2, R3, R4, R5, R6, R7) for preparatory processing prior to and/or whilst being assembled and/or laminated to form the series of fuel cells 110, 600.

There is described an apparatus 300 operable to substantially continuously manufacture fuel cells 110, 600 operable to generate electrical power from reactions of one or more reactants therein, and wherein each fuel cell 110, 600 comprises a plurality of component parts 420, 430, 460, 480, 540, 570, 598 assembled and/or laminated together in a stacked configuration, the apparatus 300 including:

(a) a mounting arrangement for receiving a plurality of rolls (R1, R2, R3, R4, R5, R6, R7) of material and/or pre-formed component parts for fabricating the fuel cells 110, 600 or parts thereof;

(b) one or more assembly devices 410, 440, 470, 490, 520, 550, 580, 593 operable, in a substantially continuous manner, to progressively assemble and/or laminate layers of material and/or pre-formed component parts from the plurality of rolls (R1, R2, R3, R4, R5, R6, R7) to manufacture a series of the fuel cells 110, 600 or a series of parts of the fuel cells; and (c) a separating station 330 operable to mutually separate the one or more functional fuel cells 110, 600 into individual fuel cells 110, 600, parts thereof or stacks 350 of such fuel cells 110, 600 for subsequent use.

In the second general apparatus, assembly in the one or more assembly devices 410, 440, 470, 490, 520, 550, 580, 593 is commenced from a substantially central layer 132 (e.g., central layer 132, i.e., packing material plate), 420 (e.g., central layer 420, i.e., metal sheet strip) providing each fuel cell 110, 600 with structural rigidity.

Optionally, in the second general apparatus, the central layer 132 (e.g., central layer 132, i.e., packing material plate), 420 (e.g., central layer 420, i.e., metal sheet strip) is a substantially rigid structural layer of each of the fuel cells 110, 600, or a central chamber of each of the fuel cells 600.

There is described a third general method of manufacturing fuel cells 110, 600 wherein each fuel cell 110, 600 comprises a plurality of component parts 120, 135, 132 (e.g., part, i.e., packing material plate), 130, 150, 160, 170, 180, 190, 200, 210, 220, 420, 430, 460, 480, 540, 570, 598 assembled and/or laminated together in a stacked configuration and forming at least one cooling chamber 120, 135, 132, 130, 150, 140, 420, 430, 480, 460, 530 and at least one electricity producing basic fuel cell 160, 170, 180, 190, 200, 210, 220, the method including steps of:

(a) progressively assembling and/or laminating layers of material and/or pre-formed component parts to manufacture a series of the fuel cells 110, 600 or parts of the fuel cells, and (b) starting the assembling and/or laminating process with a layer 400 (e.g., layer 400, i.e., the sheet strip) processed in the process to form a part 132, 420 of the cooling chamber 120, 135, 132, 130, 150, 140, 420, 430, 480, 460, 530.

Optionally, in the third general method, manufacturing of the cooling chamber 120, 135, 132, 130, 150, 140, 420, 430, 480, 460, 530 is completed or at least substantially completed before the manufacturing of the basic fuel cell 160, 170, 180, 190, 200, 210, 220 is started.

More optionally, in the third general method, the various layers 120, 135, 132 130, 150, 160, 170, 180, 190, 200, 210, 220 of the fuel cell 110, 600 are provided sequentially during the assembling and/or laminating process in such a way that the assembled layers of the fuel cell 110, 600 form a sandwich structure with the layers of the cooling chamber 120, 135, 132, 130, 150, 420, 430, 480, 460, 530 arranged between the layers of the basic fuel cell 160, 170, 180, 190, 200, 210, 220.

Optionally, in the third general method, the various layers 120, 135, 132, 130, 150, 160, 170, 180, 190, 200, 210, 220 of the fuel cell 110, 600 are provided sequentially during the assembling and/or laminating process in such a way that the assembled layers of the fuel cell 110, 600 form a sandwich structure with the group of layers of the cooling chamber 120, 135, 132, 130, 150, 420, 430, 480, 460, 530 and the group of layers of the basic fuel cell 160, 170, 180, 190, 200, 210, 220 are arranged adjacent to each other.

More optionally, in the third general method, there is fabricated a basic fuel cell comprising a membrane 190, a cathode electrode layer 180 (e.g., electrode layer 180, i.e., the first mesh), and an anode electrode layer 200 (e.g., electrode layer 200, i.e., the second mesh), wherein the assembly either of the membrane 190 or of the membrane 190 together with at least one of the electrode layers 180, 200 or of one of the electrode layers 180, 200 is the last layer or last combination of layers provided for assembly in the assembling and/or laminating process.

There is also described a fuel cell 110, 600 fabricated using one of the aforesaid general methods.

There is also described a fuel cell 110, 600 fabricated by one of the aforesaid general apparatus.

The invention claimed is:

1. A method of manufacturing fuel cells or parts of the fuel cells wherein layers of material for fabricating the fuel cells or the parts of the fuel cells are provided in rolls and wherein each fuel cell comprises a plurality of component parts assembled together in a stacked configuration comprising at least one cooling chamber and at least one electricity producing basic fuel cell, each basic fuel cell comprising a membrane, a cathode electrode layer, and an anode electrode layer, the method including:

a first step of progressively assembling a plurality of separate layers comprising a first structural plate, a packing material plate, sealing gaskets, a cooling mesh, and a second structural plate to form at least a part of the cooling chamber, and a second step of progressively assembling a plurality of separate layers to form the basic fuel cell after completing manufacturing of the at least part of the cooling chamber, and completing manufacture of the stacked configuration by providing either the membrane, the membrane together with at least one of the electrode layers, or one of the electrode layers as a last layer or last combination of layers.

2. A method as claimed in claim 1, wherein the layers of the fuel cell are provided sequentially such that the stacked configuration forms a sandwich structure with layers of the cooling chamber arranged between the layers of the basic fuel cell.

3. A method as claimed in claim 1, wherein the layers of the fuel cell are provided sequentially such that the stacked configuration forms a sandwich structure with a group of layers of the cooling chamber being arranged adjacent to a group of layers of the basic fuel cell.

4. A method as claimed in claim 1, wherein the first step and the second step of progressively assembling comprises laminating the layers of material and/or pre-formed component parts.

5. A method as claimed in claim 1, wherein the plurality of layers progressively assembled to form the at least part of the cooling chamber includes sealing gaskets sandwiched between the first and the second structural plate to define a void.

6. A method as claimed in claim 1, comprising applying a testing procedure to the series of the fuel cells or the parts of the cells to identify one or more functional fuel cells or functional parts of the fuel cells, applying a repairing procedure to any ones of the series of the fuel cells or the parts of the cells found to be defective during testing to produce one or more recovered and/or repaired functional fuel cells or functional parts of the fuel cells, and reusing in fuel cell manufacture the one or more recovered and/or repaired functional fuel cells or functional parts of the fuel cells.

7. A method as claimed in claim 6, wherein the first step of progressive assembling commences by providing the packing material plate of each of the fuel cells.

\* \* \* \* \*